United States Patent Office 3,704,295
Patented Nov. 28, 1972

3,704,295
STEROIDO[3,2-c]PYRAZOLES AND PREPARATION THEREOF
Raymond O. Clinton, East Greenbush Township, Rensselaer County, N.Y., assignor to Sterling Drug Inc., New York, N.Y.
No Drawing. Continuation-in-part of application Ser. No. 723,148, Mar. 24, 1958. This application Feb. 16, 1959, Ser. No. 793,292
Int. Cl. C07c 173/10
U.S. Cl. 260—239.5
24 Claims

ABSTRACT OF THE DISCLOSURE

This invention relates to heterocyclic substituted steroids, and in particular it is concerned with steroido[3,2-c]pyrazoles and the preparation thereof, and to intermediates in the preparation thereof.

---

This application is a continuation-in-part of my prior copending application Ser. No. 723,148, filed Mar. 24, 1958, now abandoned.

It has been found that new and useful compounds are produced when a pyrazole ring is fused through its 3- and 4-positions to the 3- and 2-positions, respectively, of a steroid nucleus, said steroid having from seventeen to about twenty-three carbon atoms exclusive of ester radicals.

The ring structure of the compounds of the invention is represented by the following structure:

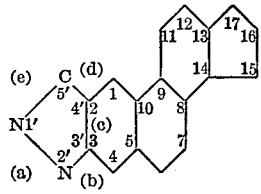

The exact nature of the steroid moiety is not critical. The utility of steroids, including those exhibiting hormonal or other pharmacological or endocrinological properties, is well-known. Such steroid moieties have from seventeen to about twenty-three carbon atoms, not counting carbon content which may be provided by esterified hydroxy groups. Esterified hydroxy-steroids are included within the scope of the invention, but the carbon content contributed by the acid moiety of the ester is not considered part of the essential carbon content of the steroid.

The steroid moiety can be any member of the estrane, 18-norestrane, androstane, etiocholane, pregnane or allopregnane series. The foregoing can contain varying degrees of unsaturation and a variety of substituents in the form of hydrocarbon radicals or functional groups conventionally employed in the steroid art. Representative of the steroid moieties which make up the compounds of the invention are those having at position 17 a hydroxy, acyloxy, oxo, or both a hydroxy and a lower-alkyl radical, characteristic of the androgenic and anabolic steroids; or a lower-alkenyl, lower-alkynyl, acetyl, hydroxyacetyl, 1,2-dihydroxyethyl, 1-hydroxyethyl, and the like radicals, optionally together with a hydroxy group at $C_{17}$, characteristic of the progestational and adrenal cortical steroids. The steroid moiety can also have one or more substituents at other positions of the nucleus, for example, hydroxy, acyloxy, or oxo radicals at positions 6, 7, 11, 12, 14 or 16; halogen atoms, preferably fluorine or chlorine, for example, at the 4-, 6-, 7-, 9-, 12- or 21-positions; and lower-alkyl groups, for example, at the 2-, 4-, 6-, 11- or 16-positions. The steroid moiety can also have one or more double bonds, especially at the 4,5- and/or 1,2- and/or 6,7-positions. The steroid moiety usually possesses angular methyl groups at $C_{10}$ and $C_{13}$, although 18- and 19-nor-steroids and 18,19-bisnor-steroids, lacking one or both of the angular methyl groups at $C_{13}$ and $C_{10}$, respectively, are also contemplated.

When acyloxy radicals are present in the steroid moiety, the acyl radicals are preferably derived from carboxylic acids having from one to about ten carbon atoms, conventionally employed in the steroid art, and having a molecular weight less than about 250. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like. Esters of inorganic acids such as phosphoric acid are also contemplated.

The compounds of the invention are prepared by reacting a 2-(1-hydroxyalkylidene)-3-oxo-steroid with a hydrazine, in particular, hydrazine itself or a mono-substituted hydrazine according to the following equation:

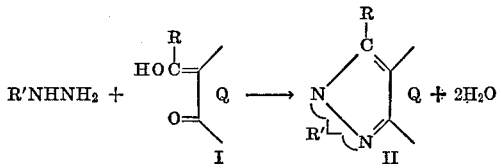

In the above general Formulas I and II, Q represents the remaining portion of the steroid moiety described above.

In the above Formulas I and II, R represents a hydrogen atom or a lower-alkyl radical, the latter having preferably from one to about four carbon atoms, thus including such groups as methyl, ethyl, propyl, isopropyl, butyl, and the like.

In the above Formula II, R' represents a hydrogen atom or a substituent inert under the conditions of the reaction between the hydrazine and 2-(1-hydroxyalkylidene)-steroid. A preferred group of substituents includes lower-alkyl radicals, e.g., methyl, ethyl, propyl, isopropyl, butyl, and the like; monocarbocyclic aryl radicals, e.g., phenyl, p-tolyl, and the like; lower-alkanoyl radicals, e.g., acetyl, propionyl, butyryl, and the like; monocarbocyclic aroyl radicals, e.g., benzoyl, p-nitrobenzoyl, p-toluyl, and the like; monocarbocyclic aryl-lower-alkanoyl radicals, e.g., phenylacetyl, β-phenylpropionyl, p-chlorophenylacetyl, and the like; monocarbocyclic aryloxy-lower-alkanoyl radicals, e.g., phenoxyacetyl, p-chlorophenoxyacetyl, p-methoxyphenoxyacetyl, and the like; and the carbamyl and guanyl radicals. When compounds where R' represents acyl, carbamyl or guanyl radicals, the starting monosubstituted hydrazines are mono-acyl hydrazines, semicarbazide or aminoguanidine, respectively. Alternatively, the compounds wherein R' represents hydrogen can be utilized as intermediates for preparing the compounds wherein R' represents an acyl radical or the carbamyl radical by reacting said compounds wherein R' represents hydrogen with the appropriate acid anhydride, or with cyanic acid (an alkali metal cyanate in the presence of mineral acid), respectively.

In the above Formula II, the radical R' is attached to one of the nitrogen atoms of the pyrazole ring, forming one of two possible isomeric structures (IIa and IIb):

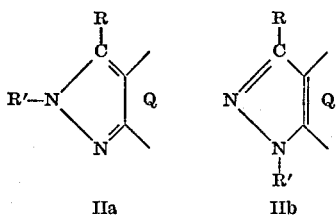

IIa  IIb

It is not known which of these two forms is produced in a given instance, and there is evidence that in some cases both isomers are obtained. This is due to the fact that the 2-hydroxy-alkylidene-3-oxo-steroid (I) in solution exists in tautomeric equilibrium, viz.:

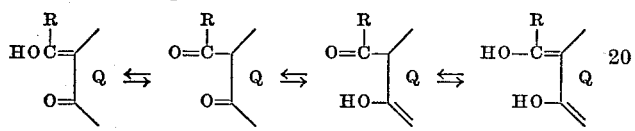

so that the substituted nitrogen portion of the hydrazine (R'NH—) can react with either the substituent in the 2-position or the substituent in the 3-position of the steroid nucleus.

It has, however, been established that the reaction of the 2-hydroxyalkylidene-3-oxo-steroid with methylhydrazine (R'=CH$_3$) gives predominantly the 1'-methyl-pyrazole derivative (form IIa). This was proved by reacting a given 2-hydroxyalkylidene-3-oxo-steroid with methylsemicarbazide, H$_2$NH(CH$_3$)CONH$_2$, followed by cyclization by pyrolysis of the resulting 3-oxo-steroid substituted in the 2-position by the radical,

H$_2$NCON(CH$_3$)NHCH= to give a pyrazole of type IIb where the methyl group is unequivocally in the 2'-position. The latter compound proved to be different from the compound produced by reacting the same 2-hydroxyalkylidene-3-oxo-steroid with methylhydrazine.

The condensation of the hydrazine or substituted hydrazine with a 2-hydroxyalkylidene-3-oxo-steroid is carried out by heating said steroid with at least one molar equivalent of the hydrazine in an inert solvent at a temperature between about 50° C. and 150° C. The inert solvent is preferably a lower-alkanol, e.g., ethanol.

If the steroid moiety has a double bond already present in the 1,2-position, the essential steroid intermediate is a 2-formyl-Δ$^1$-steroid (III; R is H) or a 2-lower-alkanoyl-Δ$^1$-steroid (III; R is lower-alkyl). If the hydrazine reactant is hydrazine itself (R' is H), the reaction is represented by the following equation:

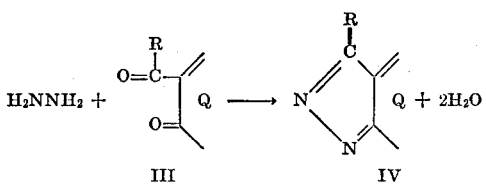

III  IV

If the hydrazine reactant is a substituted hydrazine, the reaction is represented by the following equation:

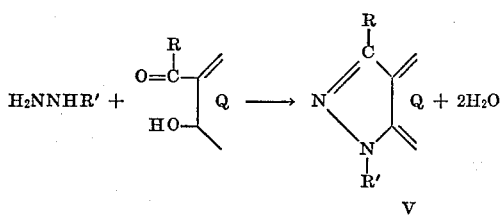

V

The intermediate 2-acyl-Δ$^1$-steroid (III) can be prepared by bromination or chlorination of a 2-acyl steriod (I) in the 2-position, followed by dehydrohalogenation with collidine or with lithium chloride in dimethylformamide solution.

Compounds having an aromatic ring A characteristic of the estrogens (estratriene compounds), viz.:

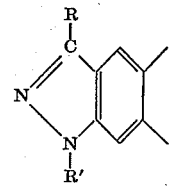

can be prepared by dehydrogenation of the corresponding Δ$^4$-19-nor-steroido-pyrazole by conventional procedures, as by heating with palladium-on-carbon catalyst.

A particularly preferred group of compounds comprises those having the structural formula

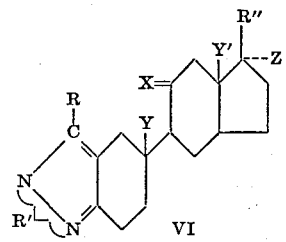

VI wherein R represents hydrogen or a lower-alkyl radical; R' represents hydrogen or a lower-alkyl, monocarbocylic aryl, lower-alkanoyl, monocarbocyclic aryloxy-lower-alkanoyl, the carbamyl or the guanyl radical; R" represents hydrogen or a lower-alkyl radical, a lower-alkenyl radical, a lower-alkynyl radical, the acetyl radical, a ketalized acetyl radical, the hydroxyacetyl radical, a ketalized hydroxyacetyl radical, the 1,2 - dihydroxyethyl radical or the 1 - hydroxyethyl radical; X is selected from the group consisting of H$_2$, (H)(OH) and O; Y and Y' represent hydrogen or the methyl radical; and Z represents hydrogen or the hydroxy radical, Z being restricted to hydroxy when R" represents hydrogen, or a lower-alkyl, lower-alkenyl or lower-alkynyl radical. Also contemplated are carboxylic acid esters of the foregoing compounds, as well as those having one double bond in the 4,5-position (VII), or two double bonds, one in the 4,5-position and the other in the 6,7-position (VIII).

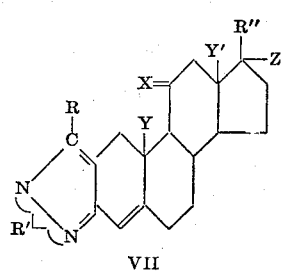

VII

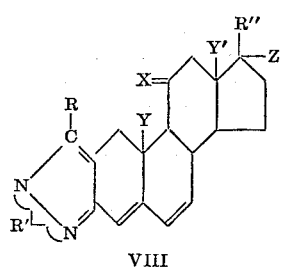

VIII

In the above general Formulas VI, VII and VIII, R", when it represents a lower-alkyl, lower-alkenyl, or lower-alkynyl radical, has from one to about four carbon atoms and may be straight or branched, and thus includes such groups as methyl, ethyl, propyl, isopropyl, butyl, isobutyl, tertiary-butyl, vinyl, 1-propenyl, 2-propenyl, ethynyl, propargyl, and the like.

The compounds of Formulas VI, VII and VIII are prepared by reacting the appropriate 2-(1-hydroxyalkylidene)-3-oxo-steroid, viz.:

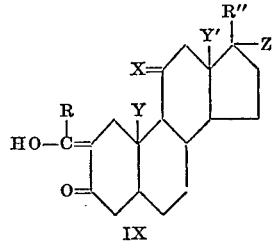

IX or the corresponding compounds where double bonds are present in the 4,5- or the 4,5 and 6,7-positions, with a hydrazine compound R'NHNH$_2$; R, R', R'', X, Z, Y and Y' having the same meanings given above, except that when the steroid moiety contains oxo groups in addition to the one at position 3, they are preferably protected as a ketal derivative to prevent side reactions with the hydrazine (hydrazone formation). For example, when compounds in which R'' represents acetyl or hydroxyacetyl are desired, these radicals are preferably ketalized by known methods, e.g., with ethylene glycol, prior to introduction of the hydroxyalkylidene radical at the 2-position and reaction with a hydrazine. The 20-monoketals of 3,20-dioxosteroids are prepared from the 3,20-diketals by selective hydrolysis by known methods, e.g., by allowing the diketal to stand at room temperature in acetone solution containing a trace of p-toluenesulfonic acid. The ketal groups are readily cleaved by dilute acid either before or after the condensation with a hydrazine. It has been found, however, that 3,20-dioxosteroids bearing hydroxy groups at the 17- and 21-positions can be selectively formylated in the 2-position without protecting the 20-oxo group by ketalization, particularly if the 21-hydroxy group is etherified with a trityl or pyranyl radical. An oxo group at the 11-position is relatively unreactive and need not be protected before reaction with hydrazine or a derivative thereof.

As a variant or ketal formation, in the case where R'' is hydroxyacetyl and Z is OH, characteristic of cortisone and related cortical hormones, the side chain can be protected against formylation by first converting the compound to the 17,20;20,21-bismethylenedioxy derivative by reacting it with formaldehyde in the presence of strong acid by known methods.

The compounds of the invention are useful as intermediates in the preparation of different species within the scope of the invention by introduction of new groups or alteration of groups already present in the steroid nucleus by known methods. For example, a steroido-[3,2-c]pyrazole having a hydroxy group in the 17-position of the steroid nucleus and a carbamyl group on the pyrazole ring (VI, VII or VIII; R' is CONH$_2$, R'' is H, Z is OH) can be oxidized to the corresponding 17-oxo compound and the latter reacted with potassium acetylide to give the 17-ethynyl-17-hydroxy derivative (VI, VII or VIII; R'' is CH≡C—, Z is OH). As another instance, a steroid[3,2-c]pyrazole having a 1-hydroxyethyl radical in the 17-position (VI, VII or VIII; R'' is CH$_2$CH(OH)—, Z is H) can be oxidized to the corresponding 17-acetyl compound (VI, VII or VIII; R'' is CH$_3$CO—, Z is H). The unsubstituted pyrazole ring (VI, VII or VIII; R, R' are H) is sensitive to oxidizing agents; therefore, it is preferable to employ the N-carbamyl derivatives (R' is CONH$_2$) if it is desired to oxidize some portion of the steroid moiety.

The intermediate 2-hydroxyalkylidene-3-oxo-steroids (I) are prepared by condensing a 3-oxo-steroid, a 3-oxo-Δ$^4$-steroid, or 3-oxo-Δ$^{4,6}$-steroid with a lower-alkyl lower-alkanoate, RCOOR''', wherein R is hydrogen or lower-alkyl and R''' is lower-alkyl in the presence of a strong base under anhydrous conditions. The strong base is preferably an alkali metal lower-alkoxide, amide or hydride. An acyl group enters the 2-position with elimination of a molecule of an alcohol as follows:

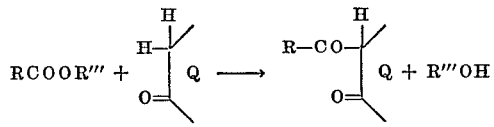

In the case wherein the radical R is lower-alkyl an alternative and preferred method comprises treating the 3-oxo-steroid with a lower-alkanoic acid anhydride in the presence of boron trifluoride. Steroids containing a 17-hydroxy group, particularly the 17-hydroxy-17-alkyl steroids, can be protected against dehydration by prior esterification.

Steroido[3,2-c]pyrazoles saturated at the 5-position and belonging to the normal series (ring juncture A/B cis, etiocholane series) are also contemplated as well as those belonging to the allo series (ring juncture A/B trans, androstane series). Although, by analogy with halogenation procedures, it would be expected that ring A saturated compounds of the etiocholane series (ring juncture A/B cis) would form 4-hydroxyalkylidene derivatives rather than 2-hydroxyalkylidene derivatives, it has been found that the latter are produced preponderantly. This was proved by hydrogenating the double bond of Δ$^4$-steroido-[3,2-c]pyrazole to produce a mixture of saturated steroido[3,2-c]pyrazoles of the androstane and etiocholane series, and showing that the ethiocholane isomer was identical with that produced by direct formation of the pyrazole from the hydroxymethylene derivative of the parent etiocholane compound. If the hydroxymethylene group had entered the 4-position, the resulting pyrazole would have been fused to the 3,4-position of the steroid nucleus and would have been different from the etoicholane pyrazole obtained by hydrogenation of the Δ$^4$ compound. Therefore, etiocholane as well as androstane compounds are useful as starting materials in the preparation of the compounds of the invention.

Pyrazoles are weakly basic substances and will form acid-addition salts upon addition of strong acids and quaternary ammonium salts upon addition of esters of strong acids.

The quaternary ammonium salts of the compounds of the invention are prepared by causing a steroido[3,2-c]pyrazole to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the steroido[3,2-c]pyrazole and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the steroido[3,2-c]pyrazoles, and serve as intermediates for non-toxic quaternary salts by conventional ion exchange reactions. All acid-addition salts, regardless of the nature of the anions, are useful as intermediates in the purification of the free bases.

Endocrinological studies of the steroido[3,2-c]pyrazoles of the invention have shown that they possess useful metabolic, hormonal or anti-hormonal properties. In particular, they exhibit one or more of the following activities: anabolic, androgenic, pituitary inhibiting, estrogenic, progestational and adrenal cortical.

The steroido[3,2-c]pyrazoles of the invention, especially those having a saturated steroid nucleus and hydroxy and lower-alkyl radicals in the 17-position, further possess advantages in being anabolic (myotrophic and nitrogen retentive) at dose levels at which they do not show an appreciable degree of sex hormonal properties. For example, 17β-hydroxy-17α-methylandrostano[3,2-c]pyrazole was found to have an anabolic activity in rats about thirty-five times that of 17α-methyltestosterone upon oral administration while having an androgenic activity only about one-fourth that of 17α-methyltestosterone. Anabolic agents are useful in the treatment of conditions arising from poor nitrogen utilization; various debilitating disease; bone conditions such as fractures, osteoporosis, osteogenesis imperfecta; degenerative joint diseases; traumatic injuries which bring about losses of large amounts of nitrogen, such as severe burns; hypochromic anemias; and the like.

Generally speaking, the known anabolic agents possess a moderate to high degree of androgenic activity and their use leads to undesirable side-effects such as virilism and hirsutism. Therefore, the separation of these activities, as found in the compounds of the present invention, which have high anabolic but low androgenic activities, is a highly desirable feature.

Some of the steroido[3.2-c]pyrazoles of the invention, especially those having a double bond in the 4,5-position of the steroid nucleus and hydroxy and lower-alkyl radicals in the 17-position, in addition to myotropic activity further possess useful pituitary inhibiting and estrogenic activity. For example, 17β - hydroxy - 17α - methyl-4-androsteno[3.2-c]pyrazole was found to have a surprising degree of pituitary inhibiting activity not to be expected from its low androgenic activity and moderate estrogenic activity. Pituitary inhibiting agents are useful in the treatment of endocrinological disorders such as menopausal syndrome, endometriosis, postpartum breast engorgement, benign prostatic hypertrophy, functional uterine bleeding, chronic cystic mastitis, and suppression or termination of reproduction processes.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

An especial advantage of the steroido[3.2-c]pyrazoles of the invention lies in the fact that they are particularly effective upon oral administration.

The invention also relates to novel intermediates of Formula I hereinabove wherein R represents hydrogen or a loweralkyl radical. A preferred class of novel intermediates are those having the Formula IX hereinabove wherein R represents hydrogen or a lower-alkyl radical; R" represents a lower-alkyl radical, a lower-alkenyl radical, a lower-alkynyl radical, the acetyl radical, a ketalized acetyl radical, the hydroxyacetyl radical, a ketalized hydroxyacetyl radical, the 1,2-dihydroxyethyl radical or the 1-hydroxyethyl radical; X represents $H_2$, (H)(OH) or O; Y and Y' represent hydrogen or the methyl radical; and Z represents hydrogen or the hydroxy radical, Z being restricted to hydroxy when R" represents a member of the group consisting of lower-alkyl, lower-alkenyl and lower-alkynyl radicals. Also contemplated are carboxylic acid esters of the foregoing compounds, as well as those having one double bond in the 4,5 position or two double bonds, one in the 4,5-position and the other in the 6,7-position. A particularly preferred class of intermediates, because of their ready availability, are those of Formula IX, and the corresponding $\Delta^4$-enes and $\Delta^{4,6}$-dienes, wherein X is $H_2$, R" is lower-alkyl and Z is OH.

Besides being useful as intermediates, the novel compounds of Formulas I and IX have also been shown to possess endocrinological activity. In particular they exhibit pituitary inhibiting properties as measured by the manifest endocrine imbalance brought about by decrease in the pituitary secretion of the follicle-stimulating and interstitial cell-stimulating hormones, while being essentially devoid of estrogenic or androgenic properties.

The structure of the compounds of the invention was established by the mode of synthesis, their ultraviolet and infrared spectra, and by the fact that the values found upon elementary analysis corresponded with the values calculated for the assigned structures.

The following examples will further illustrate the invention without the latter being limited thereby.

EXAMPLE 1

(a) 2-hydroxymethylene - 17α - methylandrostan-17β-ol-3-one.—A solution of 20.7 g. of 17α-methylandrostan-17β-ol-3-one in 500 ml. of benzene was added to sodium methoxide (prepared by dissolving 15.0 g. of sodium in 250 ml. of absolute methanol, concentrating the solution and drying the residue for one hour at 150–160° C. and 15 mm.). Ethyl formate (48.8 g.) was then added with stirring in a nitrogen atmosphere. The reaction mixture was stirred for four hours longer at room temperature, allowed to stand for about fifteen hours, stirred for two hours longer and then poured into water. The benzene layer was separated and the aqueous layer extracted with benzene. Nitrogen was bubbled through the aqueous layer to remove benzene, and the mixture was filtered. Concentrated hydrochloric acid and ice were added to the filtrate until the mixture was acid to Congo red, and the product was extracted with chloroform. The chloroform extracts were washed with water, dried over anhydrous sodium sulfate, filtered and concentrated in vacuo to a volume of 80 ml., whereupon there separated 14.89 g. of 2-hydroxymethylene - 17α - methylandrostan - 17β - ol-3-one, M.P. 179–183° C. (uncorr.). A sample when recrystallized from an ether-methanol mixture and dried at 80° C. in vacuo had the M.P. 185–190.5° C. (corr.), $[\alpha]_D^{25} = +22.3°$ (1% in chloroform); ultraviolet maximum at 282 mμ (E=10,300).

Analysis.—Calcd. for $C_{21}H_{32}O_3$ (percent): C, 75.86; H, 9.70. Found (percent): C, 76.10; H, 9.53.

2-hydroxymethylene - 17α - methylandrostan-17β-ol-3-one, when heated with a molar equivalent amount of diethylamine, gave the diethylamine salt in the form of colorless plates, M.P. 114.6–116.4° C. (dec.) (corr.), $[\alpha]_D^{25} = +16.6°$ (1% in chloroform).

Analysis.—Calcd. for $C_{21}H_{32}O_3 \cdot (C_2H_5)_2NH$ (percent): C, 74.03; H, 10.69; N, 3.45. Found (percent): C, 74.24; H, 10.93; N, 3.20.

2-hydroxymethylene - 17α - methylandrostan-17β-ol-3-one was found to possess significant pituitary inhibitory activity as measured by the enhancement of estrogen induced testicular atrophy in rats at dose levels of 10–20 mg./kg./day.

(b) 17β - hydroxy - 17α - methylandrostano[3.2-c] pyrazole [VI; R and R' are H, R" is $CH_3$, X is $H_2$, Z is OH, Y and Y' are $CH_3$].—To a warmed solution of 500 mg. of 2-hydroxymethylene - 17α - methylandrostan-17β-ol-3-one in 40 ml. of 95% ethanol was added 160 mg. of hydrazine hydrate. The reaction mixture was refluxed for three hours, concentrated to a volume of 20 ml., cooled, and the product which separated was collected and washed with ether, giving 440 mg., M.P. 144° C. (uncorr.).

The reaction was repeated starting with 3.50 g. of 2-hydroxymethylene - 17α - methylandrostan - 17β - ol-3-one and 1.12 g. of hydrazine hydrate in 200 ml. of ethanol, giving 3.33 g. of crude product. The combined products were recrystallized from 400 ml. of acetone to give 3.26 g. of product, M.P. 146–148° C. (uncorr.). All of the crude material was combined, dissolved in 200 ml. of 95% ethanol, 2 ml. of hydrazine hydrate was added and the mixture refluxed for four hours. The reaction mixture was concentrated to dryness and the residue recrystallized twice from ethanol and dried at 150° C. for eight hours in vacuo, giving 17β - hydroxy - 17α - methylandrostano[3.2-c]pyrazole, M.P. 230–242° C. (corr.), $$[\alpha]_D^{25} = +35.7 \pm 0.2°$$

(1% in chloroform); ultraviolet maximum at 223 mμ (E=4,740).

*Analysis.*—Calcd. for $C_{21}H_{32}N_2O$ (percent): C, 76.78; H, 9.82; N, 8.53. Found (percent): C, 76.65; H, 9.73; N, 8.45.

EXAMPLE 2

17β-hydroxy - 17α - methylandrostano[3.2-c]pyrazole [VI; R and R' are H, R" is $CH_3$, X is $H_2$, Z is OH, Y Y' are $CH_3$].—17α - methylandrostan - 17β - ol - 3 - one (49.54 g.) was dissolved in 1600 ml. of benzene, 400 ml. of the benzene was distilled off and the solution cooled to room temperature. There was then added 25.0 g. of sodium hydride and 60 ml. of ethyl formate (previously dried and distilled over phosphorus pentoxide), while maintaining the reaction mixture under a nitrogen atmosphere. Methanol (40 ml.) was then slowly added while the mixture was cooled in an ice bath. The reaction mixture was allowed to come to room temperature and stirred for eighteen hours in a nitrogen atmosphere. Methanol (5 ml.) was then added, and the mixture stirred for ten minutes and cooled in an ice bath. Water was added, the suspended solid material was collected by filtration, washed with ethyl acetate and mixed with the aqueous portion of the filtrate, and the latter was treated with concentrated hydrochloric acid and ice until the mixture was acidified. The resulting solid product was collected by filtration, washed with water and dried in vacuo first over solid potassium hydroxide and then over calcium chloride at 50° C. for three days, giving 51.6 g. of 2-hydroxymethylene-17α-methylandrostan-17β-ol-3-one, M.P. 158–179° C. (uncorr.). The latter material was dissolved in 600 ml. of 95% methanol, the solution filtered, and 8.4 ml. of hydrazine hydrate was added to the filtrate. The latter mixture was refluxed for ten minutes, concentrated to a volume of 250 ml. and cooled, whereupon there separated 47.0 g. of 17β-hydroxy-17α-methylandrostano[3.2-c]pyrazole, M.P. 213–228° C. (uncorr.). Upon concentration of the mother liquors a second crop of 3.69 g. was obtained. The combined product had the M.P. 225–241° C. (uncorr.) when recrystallized from ethanol and dried over phosphorus pentoxide for thirty-one hours at 100–130° C.

A solution of 17β-hydroxy-17α-methylandrostano[3.2-c]pyrazole in 350 ml. of methanol was treated with 35 ml. of 1.11 M ethereal hydrogen chloride. Upon concentration of the solution there was obtained the hydrochloride salt of 17β-hydroxy-17α-methylandrostano[3.2-c]pyrazole in solvated form, M.P. 234–254° C. (uncorr.).

When measured by nitrogen retention studies in the rat, 17β-hydroxy - 17α - methylandrostano[3.2-c]pyrazole was found to have an anabolic activity about thirty-five times that of 17α-methyltestosterone upon oral administration while having an androgenic activity only about one-fourth that of 17α-methyltestosterone.

EXAMPLE 3

17β-hydroxy - 17α - methylandrostano[3.2-c]-N-acetylpyrazole [VI; R is H, R' is $COCH_3$, R" is $CH_3$, X is $H_2$, Z is OH, Y and Y' are $CH_3$].—A mixture of 8 g. of 17β - hydroxy - 17α - methylandrostano[3.2-c]pyrazole (Examples 1 and 2) and 6 ml. of acetic anhydride in 80 ml. of pyridine was allowed to stand at room temperature for about fifteen hours. The reaction mixture was poured into 1 liter of ice water and the resulting precipitate was collected by filtration. The solid product was recrystallized twice from ethanol and dried for eighteen hours at 30° C. and for twenty-four hours in vacuo at room temperature, to give 17β-hydroxy-17α-methylandrostano[3.2-c] - N - acetylpyrazole, M.P. 111.5–115.5° C. (dec.) (corr.), containing one mole of ethanol of crystallization; $[\alpha]_D^{25} = +43.1 \pm 0.1°$ (1% in chloorform); ultraviolet maximum at 258 mμ (E=19,000).

*Analysis.*—Calcd. for $C_{23}H_{34}N_2O_2 \cdot C_2H_5OH$ (percent): C, 72.07; H, 9.68; N, 6.73. Found (percent): C, 72.40; H, 9.78; N, 6.72.

When tested for myotrophic and nitrogen retention activity in the rat, 17β-hydroxy - 17α - methylandrostano-[3.2-c]-N-acetylpyrazole exhibited anabolic and androgenic activities about equal to those of 17β-hydroxy-17α-methylandrostano[3.2-c]pyrazole. It also exhibited significant estrogenic activity.

EXAMPLE 4

17β-hydroxy - 17α - methylandrostano[3.2-c]-1'-methylpyrazole [VI; R is H, R' and R" are $CH_3$, X is $H_2$, Z is OH, Y and Y' are $CH_3$].—A solution of 1.52 g. of methylhydrazine sulfate and 1.97 g. of fused sodium acetate in 80 ml. of water was added to a solution of 3.33 g. of 2-hydroxymethylene-17α-methylandrostan - 17β - ol-3-one (Example 1, part (a)) in 400 ml. of 95% ethanol. The mixture was heated on a steam bath for thirty minutes and then diluted with 700 ml. of ethyl acetate and 500 ml. of water. The mixture was well shaken and the ethyl acetate layer was separated and washed with water. The water was in turn washed with ethyl acetate and the combined ethyl acetate extracts were dried over anhydrous sodium sulfate and concentrated in vacuo. The residue was dissolved in 300 ml. of acetone containing a small amount of methanol and the solution was concentrated to a volume of 150 ml., whereupon there was obtained in two crops 1.72 g. of 17β-hydroxy-17α-methylandrostano-[3.2-c]-1'-methylpyrazole, M.P. 234–248° C. (uncorr.), and 0.48 g., M.P. 223–248° C. (uncorr.). After successive recrystallization from ethyl acetate and methanol and drying at 90° C. in vacuo for eight hours, there was obtained a sample having the M.P. 249.5–259° C. (corr.), $[\alpha]_D^{25} = +39.0 \pm 0.1°$ (1% in 95% ethanol); ultraviolet maximum at 231 mμ (E=7,050).

*Analysis.*—Calcd. for $C_{22}H_{34}N_2O$ (percent): C, 77.14; H, 10.01; O, 4.67. Found (percent): C, 77.44; H, 9.90; O, 4.90.

A mixture of 1.85 g. of 17β-hydroxy-17α-methylandrostano[3.2-c]-1'-methylpyrazole and 10 ml. of methyl iodide in 10 ml. of methanol was allowed to stand at room temperature for sixty-three hours. The mixture was then heated at 100° C. for one hour, cooled and concentrated to dryness. The residue was recrystallized repeatedly from methanol and finally from acetonitrile. There was thus obtained the methiodide salt of 17β-hydroxy-17α-methylandrostano[3.2-c]-1'-methylpyrazole in the form of colorless massive prisms, M.P. 282.4–291.2° C. (dec.) (corr.); $[\alpha]_D^{25} = +35.8 \pm 0.4°$ (0.5% in methanol).

*Analysis.*—Calcd. for $C_{23}H_{37}IN_2O$ (percent): C, 57.01; H, 7.70; I, 26.20. Found (percent): C, 57.09; H, 7.67; I, 25.87.

EXAMPLE 5

17β-hydroxy-17α-methylandrostano[3.2-c] - N-phenylpyrazole [VI; R is H, R' is $C_6H_5$, R" is $CH_3$, X is $H_2$, Z is OH, Y and Y' are $CH_3$].—A solution of 3.33 g. of 2-hydroxymethylene-17α - methylandrostan-17β-ol-3-one (Example 1, part (a)) and 1.10 g. of phenylhydrazine in 100 ml. of methanol was gradually concentrated on a steam bath to a volume of about 50 ml. over a period of about three hours. The reaction mixture was cooled, and the product which separated was collected by filtration and recrystallized from methanol, giving 17β-hydroxy-17α-methylandrostano[3.2-c] - N - phenylpyrazole containing 1 mole of methanol of crystallizaiton, M.P. indefinite, starting at 99.5° C. (corr.), $[\alpha]_D^{25} = +55.0 \pm 0.2°$ (1% in chloroform); ultraviolet maximum at 262 m$\mu$ (E=14,000).

*Analysis.*—Calcd. for $C_{27}H_{36}N_2O \cdot CH_3OH$ (percent): C, 77.02; H, 9.23; O, 7.33. Found (percent): C, 76.90; H, 8.96; O, 7.25.

EXAMPLE 6

(a) 2-hydroxymethyleneandrostan-17$\beta$-ol-3-one was prepared from 7.58 g. of androstan-17$\beta$-ol-3-one and 15 ml. of ethyl formate in the presence of sodium methoxide in benzene solution according to the manipulative procedure described above in Example 1, part (a). The product was recrystallized successively from acetone, ethyl acetate and methanol, giving 2-hydroxymethyleneandrostan-17$\beta$-ol-3-one, M.P. indefinite, starting at 199.5° C. (corr.), $[\alpha]_D^{25} = +48.7 \pm 0.2°$ (1% in chloroform); ultraviolet maximum at 277 m$\mu$ (E=11,100); infrared maxima (potassium bromide cell) at 2.96, 6.02, 6.39, 6.82 and 6.92$\mu$.

*Analysis.*—Calcd. for $C_{20}H_{30}O_3$ (percent): C, 75.43; H, 9.50. Found (percent): C, 75.57; H, 9.81.

(b) 17$\beta$-hydroxyandrostano[3.2-c]pyrazole [VI; R, R' and R'' are H, X is $H_2$, Z is OH, Y and Y' are $CH_3$] was prepared from 5.00 g. of 2-hydroxymethyleneandrostan-17$\beta$-ol-3-one and 0.83 g. of hydrazine hydrate in 200 ml. of 95% ethanol according to the manipulative procedure described above in Example 5. The 4.16 g. of product obtained was recrystallized successively from an ethyl acetate-benzene mixture, an acetone-ether mixture, benzene and ethanol, and dried in vacuo for several days, giving 17$\beta$-hydroxyandrostano[3.2-c]pyrazole containing 1 mole of ethanol of crystallization, M.P. 127.5–128.5° C. (dec.)(corr.), $[\alpha]_D^{25} = +55.1 \pm 0.2°$ (1% in chloroform).

*Analysis.*—Calcd. for $C_{20}H_{30}N_2O \cdot C_2H_5OH$ (percent): C, 73.29; H, 10.07; $C_2H_5O$, 12.78. Found (percent): C, 73.28; H, 10.06; $C_2H_5O$, 12.76.

EXAMPLE 7

17$\beta$-propionoxyandrostano[3,2-c]pyrazole [VI; R, R' and R'' are H, X is $H_2$, Z is $OCOC_2H_5$, Y and Y' are $CH_3$].—A solution of 1.00 g. of 2-hydroxymethyleneandrostan-17$\beta$-ol-3-one (Example 6, part (a)) in 100 ml. of propionic acid was heated to 70° C. Hydrazine sulfate (0.76 g.) was added and the reaction mixture was stirred for two hours. Additional propionic acid (50 ml.) was added and the mixture stirred for seventy-two hours at 70° C. After this time, 100 ml. of water was added and the mixture stirred until solution was complete. Additional water (200 ml.) was then added, and the reaction mixture was cooled and extracted with ether. The ether extracts were washed with 10% sodium bicarbonate solution (400 ml.), dried over anhydrous sodium sulfate and concentrated. The residue was dissolved in 3 ml. of ether, 1 ml. of pentane was added, and the solution cooled in ice to give 0.83 g. of 17$\beta$-propionoxyandrostano[3.2-c]pyrazole, M.P. 82–100° C., which then resolidified and remelted at 170–178° C. (uncorr.). A sample when recrystallized from an ether-pentane mixture and then from ether, and dried in vacuo at 45° C. for eight hours, had the M.P. 181–195° C. (corr.), $[\alpha]_D^{25} = +40.2 \pm 0.1°$ (1% in chloroform); ultraviolet maximum at 223 m$\mu$ (E=4,900).

*Analysis.*—Calcd. for $C_{23}H_{34}N_2O_2$ (percent): C, 74.55; H, 9.25; O, 8.64. Found (percent): C, 74.45; H, 9.28; O, 8.30.

EXAMPLE 8

(a) 17$\alpha$-ethyl-2-hydroxymethyleneandrostan-17$\beta$-ol-3-one was prepared from 7.0 g. of 17$\alpha$-ethylandrostan-17$\beta$-ol-3-one, 8 ml. of ethyl formate and 3.8 g. of sodium methoxide in 150 ml. of benzene according to the manipulative procedure described above in Example 1, part (a). The product was obtained in the form of the solid sodium salt and used directly in the next reaction.

(b) 17$\alpha$-ethyl - 17$\beta$ - hydroxyandrostano[3.2-c]pyrazole [VI; R and R' are H, R'' is $C_2H_5$, X is $H_2$, Z is OH, Y and Y' are $CH_3$].—A suspension of 3.68 g. of the sodium salt of 17$\alpha$-ethyl-2-hydroxymethyleneandrostan-17$\beta$-ol-3-one, obtained above in part (a), was treated with dilute hydrochloric acid, the mixture was filtered, and the solid material washed with water and dissolved in ethanol. Hydrazine hydrate (1.5 g.) was then added, and the reaction carried out in the same manner as described above in Example 5. The crude product, 2.38 g., M.P. 235–253° C. (uncorr.), was recrystallized twice from ethanol, and dried over phosphorus pentoxide for two days at 30° C. and 25 mm., giving 17$\alpha$-ethyl-17$\beta$-hydroxyandrostano[3.2-c]pyrazole containing 1 mole of ethanol of crystallization, M.P. 249–251.5° C. (corr.), $[\alpha]_D^{25} = +32.7 \pm 0.2°$ (1% in chloroform); ultraviolet maximum at 224 m$\mu$ (E=5,100).

*Analysis.*—Calcd. for $C_{24}H_{40}N_2O_2$ (percent): C, 74.18; H, 10.38; N, 7.21. Found (percent): C, 74.32; H, 10.28; N, 7.12.

EXAMPLE 9

(a) 2-hydroxymethylene-4-androsten-17$\beta$-ol-3-one was prepared from 25 g. of testosterone, 7.5 g. of sodium hydride and 25 ml. of ethyl formate in 500 ml. of dry benzene according to the manipulative procedure described above in Example 2. There was thus obtained 21.63 g. of 2-hydroxymethylene-4-androsten-17$\beta$-ol-3-one in crystalline form.

(b) 17$\beta$-hydroxy-4-androsteno[3.2-c]pyrazole [VII; R, R' and R'' are H, X is $H_2$, Z is OH, Y and Y' are $CH_3$] was prepared from 2.5 g. of 2-hydroxymethylene-4-androsten-17$\beta$-ol-3-one and 1.7 g. of hydrazine hydrate in 80 ml. of methanol according to the manipulative procedure described above in Example 5. The crude product was recrystallized from ethanol and dried for sixteen hours at 120° C., giving 17$\beta$-hydroxy-4-androsteno[3.2-c]pyrazole, M.P. 227–240° C. (uncorr.) with previous softening.

(c) 17$\beta$-hydroxy-4-androsteno[3.2-c]pyrazole - N - carboxamide [VII; R is H, R' is $CONH_2$, R'' is H, X is $H_2$, Z is OH, Y and Y' are $CH_3$].—17$\beta$-hydroxy-4-androsteno[3.2-c]pyrazole (5 g. as obtained in part (b) above) was dissolved in 200 ml. of methanol and water (50 ml.) was added until precipitation began. Methanol (10 ml.) was added and the solution warmed until the steroid was completely redissolved. The solution was cooled and 15 ml. of ethereal hydrogen chloride containing 0.016 mole of hydrogen chloride was added, followed by 1.3 g. of potassium cyanate in about 3 ml. of water. The desired product precipitated immediately, and it was collected by filtration and recrystallized three times from methanol giving 17$\beta$-hydroxy-4-androsteno[3.2 - c]pyrazole-N-carboxamide, M.P. 221.5–228° C. (corr.), $$[\alpha]_D^{25} = +83.4 \pm 0.1°$$

(1% in pyridine); ultraviolet maxima at 236 and 280 m$\mu$ (E=8,500 and 23,600, respectively).

*Analysis.*—Calcd. for $C_{21}H_{29}N_3O_2$ (percent): C, 70.95; H, 8.22; N, 11.82. Found (percent): C, 71.08; H, 8.37; N, 12.19.

17$\beta$-hydroxy-4-androsteno[3.2 - c]pyrazole-N-carboxamide can be reacted with acetic anhydride, propionic anhydride, caproyl chloride, succinic anhydride, $\beta$-cyclopentylpropionyl chloride, benzoyl chloride, p-nitrobenzoyl chloride, 3,4,5-trimethoxybenzoyl chloride, phenylacetyl chloride, or cinnamoyl chloride, by heating in the presence of pyridine, to give, respectively, 17$\beta$-acetoxy-4-androsteno[3.2-c]pyrazole-N-carboxamide, 17$\beta$-propionoxy-4-androsteno[3.2-c]pyrazole-N-carboxamide, 17$\beta$-caproyloxy-4-androsteno[3.2-c]pyrazole-N-carboxamide, 17β-(β-carboxypropionoxy)-4-androsteno[3.2-c]pyrazole-N-carboxamide,
17β-(β-cyclopentylpropionoxy)-4-androsteno[3.2-c]pyrazole-N-carboxamide,
17β-benzoyloxy-4-androsteno[3.2-c]pyrazole-N-carboxamide,
17β-(p-nitrobenzoyloxy)-4-androsteno[3.2-c]pyrazole-N-carboxamide,
17β-(3,4,5-trimethoxybenzoyloxy)-4-androsteno[3.2-c]pyrazole-N-carboxamide,
17β-phenylacetoxy-4-androsteno[3.2-c]pyrazole-N-carboxamide, or
17β-cinnamoyloxy-4-androsteno[3.2-c]pyrazole-N-carboxamide.

EXAMPLE 10

17β-hydroxy-4-androsteno[3.2-c]pyrazole [VII; R, R' and R" are H, X is $H_2$, Z is OH, Y and Y' are $CH_3$].—A mixture of 1.1 g. of 17β-hydroxy-4-androsteno[3.2-c]pyrazole-N-carboxamide Example 9, part (c)), 1.0 ml. of concentrated hydrochloric acid and 55 ml. of 95% ethanol was refluxed for four hours. The reaction mixture was cooled, 1 ml. of concentrated ammonium hydroxide was added and the mixture allowed to stand for ten minutes. Water was then added and the ethanol removed by concentration in vacuo. The remaining aqueous suspension was filtered to give 1.0 g. of 17β-hydroxy-4-androsteno[3.2-c]pyrazole, M.P. 276–277° C. (uncorr.). Upon recrystallization from methanol and drying at 110° C. in vacuo there was obtained a sample having the M.P. 275–276.5° C. (corr.), $[\alpha]_D^{25}=+147.6\pm0.1°$ (1% in pyridine); ultraviolet maximum at 260 mμ (E=10,970).

Analysis.—Calcd. for $C_{20}H_{28}N_2O$ (percent): C, 76.88; H, 9.03; N, 8.97. Found (percent): C, 76.86; H, 8.75; N, 9.37.

EXAMPLE 11

17-oxo-4-androsteno[3.2 - c]pyrazole-N-carboxamide.—A mixture of 8.0 g. of 17β-hydroxy-4-androsteno[3,2-c]pyrazole-N-carboxamide (Example 9) and 500 ml. of glacial acetic acid was stirred until partial solution had occurred. The mixture was then cooled to 14° C. in a water bath, and a solution of 3.2 g. of chromic oxide in 8 ml. of water and 24 ml. of glacial acetic acid was added dropwise during a period of ten minutes. The reaction mixture was stirred for five and one-half hours, an equal volume of water added, and the solid material which separated was collected by filtration, washed with water and dissolved in chloroform. The chloroform solution was filtered, concentrated to a small volume, and ether was added to cause crystallization of the product. There was thus obtained 4.83 g. of 17-oxo-4-androsteno[3.2-c]pyrazole-N-carboxamide, M.P. 270–271° C. (uncorr.).

EXAMPLE 12

17-oxo-4-androsteno[3.2-c]pyrazole.—A solution of 4.57 g. of 17-oxo-4-androsteno[3.2-c]pyrazole-N-carboxamide and 10 ml. of concentrated hydrochloric acid in 1.2 liters of ethanol was refluxed for one-half hour. An additional 600 ml. of ethanol was added and reflux continued for six hours. Concentrated ammonium hydroxide (10 ml.) was added and the mixture concentrated in vacuo to one-half the original volume. Additional ammonium hydroxide (10 ml.) and 600 ml. of water were then added, and distillation in vacuo was continued until the ethanol was all removed. The mixture was cooled and the product collected by filtration to give 3.95 g. of 17-oxo-4-androsteno[3.2-c]pyrazole, M.P. 244–255° C. (uncorr.). When recrystallized from acetone and dried for twenty-four hours at 115° C. in vacuo, there was obtained a sample having the M.P. 258.6–263.8° C. (corr.), $[\alpha]_D^{25}=+199.1\pm0.2°$ (1% in 95% ethanol); ultraviolet maximum at 261 mμ (E=11,300).

Analysis.—Calcd. for $C_{20}H_{26}N_2O$ (percent): C, 77.38; H, 8.44; N, 9.03. Found (percent): C, 77.49; H, 8.65; N, 8.97.

EXAMPLE 13

(a) 2-hydroxymethylene-17α-methyl - 4 - androsten-17β-ol-3-one was prepared from 10.0 g. of 17α-methyl-4-androsten-17β-ol-3-one, 10 ml. of ethyl formate and 3.0 g. of sodium hydride in 200 ml. of benzene according to the manipulative procedure described above in Example 2. There was thus obtained 11.5 g. of 2-hydroxymethylene-17α-methyl-4-androsten-17β-ol-3-one which was further purified by recrystallization first from acetone and then from a methanol-water mixture. The purified sample was dried at 50° C. over solid potassium hydroxide for twenty-four hours and had the M.P. 178.5–180° C. (corr.), $[\alpha]_D^{23}=+14.0°$ (1% in chloroform); ultraviolet maxima at 252 and 307 mμ (E=12,000 and 6,030 respectively).

Analysis.—Calcd. for $C_{21}H_{30}O_3$ (percent): C, 76.32; H, 9.15. Found (percent): C, 76.36; H, 9.19.

(b) 17β-hydroxy-17α-methyl - 4 - androsteno[3.2-c]pyrazole [VII; R and R' are H, R" is $CH_3$, X is $H_2$, Z is OH, Y and Y' are $CH_3$] was prepared from 3.31 g. of 2-hydroxymethylene-17α-methyl - 4 - androsten-17β-ol-3-one and 1.00 g. of hydrazine hydrate in 200 ml. of 95% ethanol according to the manipulative procedure described above in Example 5. There was thus obtained 3.16 g. of 17β-hydroxy-17α-methyl-4-androsteno[3.2-c]pyrazole, further purified by recrystallization from methanol and acetone to give a sample having the M.P. 248–258.5° C. (corr.), $[\alpha]_D^{25}=+132.6\pm0.2°$ (1% in pyridine); ultraviolet maximum at 261 mμ (E=10,500); infrared maxima at 3.12, 3.43, 6.12, 6.65, 6.89 and 7.28μ.

Analysis.—Calcd. for $C_{21}H_{30}N_2O$ (percent): C, 77.25; H, 9.26; N, 8.58. Found (percent): C, 77.26; H, 9.19; N, 8.42.

EXAMPLE 14

(a) 2-hydroxymethylene-17α-ethyl-4-androsten-17β-ol-3-one was prepared from 17.19 g. of 17α-ethyl-4-androsten-17β-ol-3-one, 17 ml. of ethyl formate and 5 g. of sodium hydride in 350 ml. of benzene according to the manipulative procedure described above in Example 2. The acidic product was obtained in the form of a gum which was used directly in the next reaction without further purification.

(b) 17β-hydroxy-17α-ethyl-4-androsteno[3.2-c]pyrazole [VII; R and R' are H, R" is $C_2H_5$, X is $H_2$, Z is OH, Y and Y' are $CH_3$] was prepared from 2-hydroxymethylene-17α-ethyl-4-androsten-17β-ol-3-one (about 5.75 g. of resinous material containing methanol) and 2.4 g. of hydrazine hydrate in 100 ml. of ethanol according to the manipulative procedure described above in Example 5. There was thus obtained 3.61 g. of 17β-hydroxy-17α-ethyl-4-androsteno[3.2-c]pyrazole, M.P. 271–286° C. (uncorr.), which was further purified by recrystallizing it from 200 ml. of hot ethanol and drying in vacuo at 115° C. to give a sample having the M.P. 284.5–290.5° C. (corr.), $$[\alpha]_D^{25}=+102.1\pm0.2°$$

(1% in chloroform); ultraviolet maximum at 261 mμ (E=10,561).

Analysis.—Calcd. for $C_{22}H_{32}N_2O$ (percent): C, 77.60; H, 9.47; N, 8.23. Found (percent): C, 77.88; H, 9.20; N, 7.96.

EXAMPLE 15

(a) 2-hydroxymethylene-17α-vinyl-4-androsten-17β-ol-3-one.—A mixture of 12.04 g. of 17α-vinyl-4-androsten-17β-ol-3-one, 12 ml. of ethyl formate and 4.0 g. of sodium hydride in 300 ml. of benzene was kept at room temperature for three days under a nitrogen atmosphere. After this time about 2 g. of sodium methoxide was added and the reaction mixture allowed to stand for seven days longer. The reaction mixture was worked up according to the manipulative procedure described above in Example 2, giving 11.46 g. of 2-hydroxymethylene-17α-vinyl-4-androsten-17β-ol-3-one in semi-crystalline form.

(b) 17β-hydroxy-17α-vinyl-4-androsteno[3.2-c]pyrazole [VII; R and R' are H, R" is CH=CH$_2$, X is H$_2$, Z is OH, Y and Y' are CH$_3$] was prepared from 3.4 g. of 2-hydroxymethylene-17α-vinyl-4-androsten-17β-ol-3-one and 1.6 g. of hydrazine hydrate in ethanol solution according to the manipulative procedure described above in Example 5. There was thus obtained 3.11 g. of 17β-hydroxy-17α-vinyl-4-androsteno[3.2-c]pyrazole, M.P. 235–259° C. (uncorr.), which was further purified by several recrystallizations from ethanol and drying over phosphorus pentoxide at 150° C. in vacuo to give a sample having the M.P. 247–259.5° C. (corr.), $[\alpha]_D^{25} = +101.2 \pm 0.2°$ (1% in chloroform); ultraviolet maximum at 260 mμ (E=10,600).

*Analysis.*—Calcd. for C$_{22}$H$_{30}$N$_2$O (percent): C, 78.06; H, 8.93; N, 8.28. Found (percent): C, 78.30; H, 9.19; N, 8.36.

EXAMPLE 16

(a) 17α-ethynyl-2-hydroxymethylene-4-androsten-17β-ol-3-one.—To a solution of 14.2 g. of 17α-ethynyl-4-androsten-17β-ol-3-one in 300 ml. of dry pyridine was added 23 ml. of dry ethyl formate and then a solution of sodium ethoxide in ethanol (from 2.1 g. of sodium and 35 ml. of absolute ethanol). The reaction mixture was allowed to stand at room temperature for forty-two hours and then poured onto ice-water. Glacial acetic acid (218 ml.) was added and the gummy product was separated and dissolved in ether. The ether solution was washed with a solution of 30 g. of potassium hydroxide in 1.5 liters of water, and the aqueous layer was cooled to 5° C. and acidified with 6 N hydrochloric acid. The precipitated product was collected by filtration and dried in vacuo over phosphorus pentoxide at 60° C., giving 13.5 g. of 17α-ethynyl-2-hydroxymethylene-4-androsten-17β-ol-3-one.

(b) 17α-ethynyl-17β-hydroxy-4-androsteno[3.2-c]pyrazole [VII; R, and R' are H, R" is C≡CH, X is H$_2$, Z is OH, Y and Y' are CH$_3$] was prepared from 5.0 g. of 17α-ethynyl-2-hydroxymethylene-4-androsten-17β-ol-3-one and 0.77 g. of hydrazine hydrate according to the manipulative procedure describe above in Example 5. The resulting product was recrystallized from methanol and from aqueous acetone and dried in vacuo at 115° C. for twenty-four hours, giving 17α-ethynyl-17β-hydroxy-4-androsteno[3.2-c]pyrazole, M.P. 239.6–246.6° C. (corr.);

$$[\alpha]_D^{25} = 29.0 \pm 0.1°$$

(1% in chloroform); ultraviolet maximum at 261 mμ (E=10.700). It had infrared bands at 3.10μ and 4.77μ, characteristic of an acetylene linkage.

*Analysis.*—Calcd. for C$_{22}$H$_{28}$ON$_2$ (percent): C, 78.53; H, 8.39. Found (percent): C, 78.51; H, 8.35.

EXAMPLE 17

(a) 2-hydroxymethylene-4-pregnen-20β-ol-3 - one was prepared from 13.15 g. of 4-pregnen-20β-ol-3-one, 15 ml. of ethyl formate and 3.0 g. of sodium hydride in 300 ml. of benzene according to the manipulative procedure described above in Example 2.

(b) 20β-hydroxy-4-pregneno[3,2-c]pyrazole [VII; R and R' are H, R" is CH(OH)CH$_3$, X is H$_2$, Z is H, Y and Y' are CH$_3$].—The total acidic fraction of the product obtained above in part (a), comprising 2-hydroxymethylene-4-pregnen-20β-ol-3-one, in 150 ml. of ethanol was treated with 10 ml. of hydrazine hydrate, and the mixture was refluxed for one hour and allowed to stand at room temperature for about three days. The product was isolated and recrystallized several times from methanol giving 20β-hydroxy-4-pregneno[3.2-c]pyrazole, M.P. 262.5–269° C. (corr.), $[\alpha]_D^{25} = +114.9 \pm 0.1°$ (1% in chloroform); ultraviolet maximum at 260 mμ (E=11,000).

*Analysis.*—Calcd. for C$_{22}$H$_{32}$N$_2$O (percent): C, 77.60; H, 9.47; O, 4.70. Found (percent): C, 77.49; H, 9.43; O, 4.60.

EXAMPLE 18

20β-hydroxy-4-pregneno[3.2-c]pyrazole - N - carboxamide [VII; R is H, R' is H$_2$NCO, R" is CH(OH)CH$_3$, X is H$_2$, Z is H, Y and Y' are CH$_3$].—To a solution of 8.93 g. of 20β-hydroxy-4-pregneno[3.2-c]pyrazole in 360 ml. of methanol was added 40 ml. of water. Potassium cyanate (5.32 g.) in 10 ml. of water was then added, followed by 6 ml. of concentrated hydrochloric acid. The product which separated was collected by filtration and dried, giving 9.66 g. of 20β-hydroxy-4-pregneno[3.2-c]pyrazole-N-carboxamide, M.P. 225–226.5° C. (uncorr., immersed at 220° C.). Recrystallization from acetone, methanol and again from acetone gave a sample in the form of colorless needles, M.P. 219.8–232.2° C. (corr.), $$[\alpha]_D^{25} = +54.4 \pm 0.3°$$

(0.5% in chloroform).

*Analysis.*—Calcd. for C$_{23}$H$_{33}$N$_3$O$_2$ (percent): C, 72.02; H, 8.67; N, 10.96. Found (percent): C, 71.82; H, 8.51; N, 11.14.

EXAMPLE 19

(a) 20 - oxo - 4 - pregneno[3.2-c]pyrazole-N-carboxamide [VII; R is H, R' is H$_2$NCO, R" is COCH$_3$, X is H$_2$, Z is H, Y and Y' are CH$_3$].—A solution of 4.0 g. of chromic oxide in 40 ml. of pyridine was added to a solution of 4.00 g. of 20β - hydroxy - 4 - pregneno[3.2-c]pyrazole-N-carboxamide in 60 ml. of pyridine. The reaction mixture was kept at room temperature for about fifteen hours and then poured into 50 g. of ice and 100 ml. of water. The product was extracted with ethyl acetate, and the ethyl acetate extracts were washed with water, dried and concentrated in vacuo. The residue was recrystallized from acetone, from methanol and again from acetone, giving 20-oxo-4-pregneno[3.2-c]pyrazole-N - carboxamide, M.P. 226.4–234.4° C.(corr.); $[\alpha]_D^{25} = +156.4 \pm 0.2°$ (0.5% in chloroform); ultraviolet maxima at 225, 236, 242 and 279 mμ (E=7,150, 8,000 8,000 and 21,700, respectively).

*Analysis.*—Calcd. for C$_{23}$H$_{31}$N$_3$O$_2$ (percent): C, 72.41; H, 8.19; N, 11.01; O, 8.39. Found (percent): C, 72.45; H, 8.24; N, 11.24; O, 8.40.

(b) 20 - oxo - 4 - pregneno[3.2-c]pyrazole [VII; R and R' are H, R" is COCH$_3$, X is H$_2$, Z is H, Y and Y' are CH$_3$] was prepared by heating 20 - oxo - 4-pregneno-[3.2-c]pyrazole-N-carboxamide with a dilute solution of hydrochloric acid in ethanol according to the manipulative procedure described above in Example 12. A sample of 20-oxo-4-pregneno[3.2-c]pyrazole in the pure state had the M.P. 259.6–269.6° C.(corr.); $[\alpha]_D^{25} = +233.9°$ (1% in chloroform); ultraviolet maximum at 261 mμ (E=13,000).

*Analysis.*—Calcd. for C$_{22}$H$_{30}$N$_2$O (percent): C, 78.06; H, 8.93; N, 8.28. Found (percent): C, 78.01; H, 8.66; N, 8.00.

20 - oxo - 4 - pregneno[3.2-c]pyrazole was found to have a progestational activity about 4–8 times that of 17-ethynyltestosterone when administered orally, as measured by the endometrial response in the rabbit.

EXAMPLE 20

(a) 2 - hydroxymethylene - 17α - methyl - 4,6-androstadien - 17β - ol - 3 - one was prepared from 11.4 g. of 17α - methyl - 4,6 - androstadien - 17β - ol - 3 - one, 12.0 ml. of ethyl formate and 3.7 g. of sodium hydride in 250 ml. of benzene according to the manipulative procedure described above in Example 2. There was thus obtained 5.3 g. of 2 - hydroxymethylene - 17α - methyl-4,6 - androstadien - 17β - ol - 3 - one, M.P. 117–123° C.(uncorr.).

(b) 17β - hydroxy - 17α - methyl - 4,6 - androstadieno-[3.2-c]pyrazole [VIII; R and R' are H, R" is CH$_3$, X is H$_2$, Z is OH, Y and Y' are CH$_3$] was prepared from 6.0 g. of 2 - hydroxymethylene - 17α - methyl - 4,6-androstadien-17β-ol-3-one and 1.9 g. of hydrazine hydrate in 200 ml. of ethanol according to the manipulative procedure described above in Example 5. There was thus obtained 4.6 g. of 17β - hydroxy - 17α - methyl-4,6-androstadieno[3.2-c]pyrazole, M.P. 278–282° C.(uncorr.), which was further purified by recrystallization from ethyl acetate to give a sample having the M.P. 279–284° C.(corr.), $[\alpha]_D^{25}=-126.1\pm0.1°$ (1% in pyridine); ultraviolet maxima at 226, 232, 297 and 308 mμ (E=9,194, 8,244, 24,329 and 18,355, respectively).

*Analysis.*—Calcd. for $C_{21}H_{28}N_2O$ (percent): C, 77.73; H, 8.70; N, 8.64. Found (percent): C, 77.92; H, 8.53; N, 8.35.

EXAMPLE 21

(a) 2 - hydroxymethylene - 4,6 - androstadien - 17β-ol-3-one was prepared from 12.41 g. of 4,6 - androstadien-17β-ol-3-one, 14 ml. of ethyl formate and 3.9 g. of sodium hydride according to the manipulative procedure described above in Example 2. There was thus obtained 13.15 g. of 2-hydroxymethylene-4,6-androstadien-17β-ol-3-one, M.P. 80–100° C.(uncorr.).

(b) 17β - hydroxy - 4,6 - androstadieno[3.2-c]pyrazole [VIII; R, R' and R" are H, X is $H_2$, Z is OH, Y and Y' are $CH_3$] was prepared from 3.14 g. of 2-hydroxymethylene - 4,6 - androstadien - 17β-ol-3-one and 1.45 ml. of hydrazine hydrate in 50 ml. of ethanol according to the manipulative procedure described above in Example 5. There was thus obtained 2.67 g. of 17β-hydroxy-4,6-androstadieno[3.2-c]pyrazole, M.P. 264–268° C.(uncorr.). The latter was recrystallized from ethanol and from ethyl acetate and dried in vacuo at 70° C. for twenty-four hours to give a sample in the form of pale yellowish crystals, M.P. 272.8–277.0° C.(corr.), $[\alpha]_D^{25}=-137.2\pm0.1°$ (1% in ethanol); ultraviolet maxima at 220, 225, 232, 296 and 300 mμ (E=7,600, 8,500, 7,800, 22,000 and 16,600, respectively).

*Analysis.*—Calcd. for $C_{20}H_{26}N_2O$ (percent): C, 77.38; H, 8.44; N, 9.03. Found (percent): C, 77.40; H, 8.42; N, 9.29.

EXAMPLE 22

(a) 2 - hydroxymethylene - 4,4,17α - trimethyl - 5-androsten - 17β - ol - 3 - one was prepared from 6.2 g. of 4,4,17α - trimethyl - 5 - androsten - 17β - ol - 3 - one, 16 ml. of ethyl formate and sodium methoxide (from 2.2 g. of sodium and 40 ml. of methanol) in 400 ml. of benzene according to the manipulative procedure described above in Example 1, part (a). There was thus obtained 5.54 g. of 2 - hydroxymethylene-4,4,17α-trimethyl-5-androsten-17β-ol-3-one.

(b) 17β-hydroxy-4,4,17α-trimethyl-5-androsteno[3.2-c]pyrazole was prepared from 1. 61 g. of 2-hydroxymethylene-4,4,17α-trimethyl-5-androsten-17β-ol-3-one and 0.30 g. of hydrazine hydrate according to the manipulative procedure described above in Example 5. The product was recrystallized from methanol and dried at 115° C. in vacuo for twenty-four hours to give 0.81 g. of 17β-hydroxy - 4,4,17α - trimethyl - 5-androsteno[3.2-c]pyrazole, M.P. 270.4–276.0° C.(corr.), $[\alpha]_D^{25}=-55.0\pm0.2°$ (1% in 95% ethanol); ultraviolet maximum at 223 mμ (E=5,300).

*Analysis.*—Calcd. for $C_{23}H_{34}N_2O$ (percent): C, 77.92; H, 9.67; N, 7.90. Found (percent): C, 78.23; H, 9.47; N, 7.65.

EXAMPLE 23

(a) 2-hydroxymethylene-17α-methyl-19-norandrostan-17β - ol - 3 - one was prepared from 4.35 g. of 17α-methyl - 19 - norandrostan - 17β - ol - 3 - one, 10 ml. of ethyl formate and 2.40 g. of sodium hydride according to the manipulative procedure described above in Example 2. There was thus obtained 4.35 g. of 2-hydroxymethylene - 17α - methyl - 19 - norandrostan - 17β-ol-3-one, M.P. 190–200° C.(uncorr.). A sample obtained in the pure state had the M.P. 206.2–210.6° C.(corr.), $[\alpha]_D^{25}=+96.1\pm0.1°$ (1% in chloroform); ultra-violet maximum at 283 mμ (E=7,800).

*Analysis.*—Calcd. for $C_{20}H_{30}O_3$ (percent): C, 75.44; H, 9.50. Found (percent): C, 75.61; H, 9.44.

(b) 17β-hydroxy - 17α-methyl-19-norandrostano[3.2-c]pyrazole [VI; R and R' are H, R" is $CH_3$, X is $H_2$, Z is OH, Y is H, Y' is $CH_3$] was prepared from 3.18 g. of 2-hydroxymethylene-17α-methyl - 19 - norandrostan-17β-ol-3-one and 0.55 g. of hydrazine hydrate in 50 ml. of ethanol according to the manipulative procedure described above in Example 5. There was thus obtained 2.80 g. of 17β-hydroxy - 17α - methyl - 19 - norandrostano[3.2-c]pyrazole, M.P. 126–132° C. (uncorr.) (gas evolution). A sample was obtained in the pure state in the form of prisms, M.P. 140.4–152.4° C. (corr.), $[\alpha]_D^{25}= +90.0\pm0.1°$ (1% chloroform); ultraviolet maximum at 224 mμ (E=4,800).

*Analysis.*—Calcd. for $C_{20}H_{30}N_2O$ (percent): C, 76.38; H, 9.62; N, 8.91. Found (percent): C, 76.07; H, 9.62; N, 8.98.

EXAMPLE 24

(a) 2-acetyl-17β-acetoxyandrostan-3-one.—A mixture of 9.6 g. (0.16 mole) of glacial acetic acid and 50 ml. of ethylene dichloride was cooled in an ice-bath, and dry boron trifluoride gas was passed into the solution until it was saturated. With continued addition of boron trifluoride, a solution of 11.60 g. (0.04 mole) of androstan-17β-ol-3-one and 12.2 g. (11.4 ml., 0.12 mole) of acetic anhydride in 75 ml. of ethylene dichloride was added. The reaction mixture was stirred in the ice-bath for thirty minutes and at room temperature for three hours, and then poured into a solution of 30 g. of sodium acetate trihydrate in 200 ml. of water. The organic solvent was distilled off, and the residue refluxed for forty-five minutes and diluted with water. The solid product was collected by filtration, suspended in 200 ml. of methanol containing 23 ml. of 35% sodium hydroxide solution with stirring, 25 ml. of water was added, and the solution allowed to stand for one hour. The solution was acidified with glacial acetic acid, the methanol removed in vacuo, and water was added to precipitate a gummy product. The latter was separated, dried and dissolved in 25 ml. of acetic anhydride and 20 ml. of pyridine. The solution was kept at room temperature overnight and then heated for one hour on a steam bath. The reaction mixture was added to cold, dilute sulfuric acid and the product collected, washed, dissolved in hot methanol, and the solution filtered. Water was added to the filtrate to the point of turbidity, and the product which separated upon cooling was collected and dried at 70° C.; yield 11.59 g., M.P. 132–158° C. (uncorr.). The latter was dissolved in n-hexane and chromatographed on alumina. The fraction eluted with 20% ether in n-pentane was recrystallized from acetone and dried in vacuo at 110° C. for eight hours, giving 6.98 g. of 2-acetyl-17β-acetoxyandrostan-3-one, M.P. 183.0–184.6° C. (corr.), $[\alpha]_D^{25}= +39.4\pm0.2°$ (1% in chloroform); ultraviolet maximum at 290 mμ (E=9,100).

*Analysis.*—Calcd. for $C_{23}H_{34}O_4$ (percent): C, 73.76; H, 9.15. Found (percent): C, 73.80; H, 9.55.

There was isolated from the foregoing reaction mixture as a byproduct, 2-acetyl-3,17β-diacetoxy-2-androstan, the enol acetate of 2-acetyl-17β-acetoxyandrostan-3-one, obtained in the form of colorless needles, M.P. 169.6–177.4° C. (corr.), $[\alpha]_D^{25}= +59.2\pm0.2°$ (1% in chloroform); ultraviolet maximum at 240 mμ (E=8,850).

*Analysis.* Calcd. for $C_{25}H_{36}O_5$ (percent): C, 72.08; H, 8.71. Found (percent): C, 72.15; H, 8.63.

(b) 17β-acetoxyandrostano[3.2-c] - 5' - methylpyrazole [VI; R is $CH_3$, R' is H, R" is H, X is $H_2$, Z is $OCOCH_3$, Y and Y' are $CH_3$] was prepared from 3.00 g. of 2-acetyl-17β-acetoxyandrostan-3-one and 0.45 g. of hydrazine hydrate in 50 ml. of ethanol according to the manipulative procedure described above in Example 5. The resulting product was recrystallized from ethyl acetate and from aqueous ethanol and dried in vacuo for eight hours at 120–125° C., giving 17β-acetoxyandrostano[3.2-c]-5'- methylpyrazole, M.P. 254.0–262.8° C. (corr.), $[\alpha]_D^{25}$= +41.7° (1% in chloroform); ultraviolet maximum at 224 mμ (E=5,300).

*Analysis.*—Calcd. for $C_{23}H_{34}N_2O_2$ (percent): C, 74.55; H, 9.25; O, 8.64. Found (percent): C, 74.25; H, 9.06; O, 8.90.

17β - acetoxyandrostano[3.2-c]-5′-methylpyrazole was saponified to give 17β-hydroxyandrostano[3.2-c]-5′-methylpyrazole, M.P. 236.4–240.6° C. (corr.), $[\alpha]_D^{25}$= +60.1° (1% in chloroform); ultraviolet maximum at 225 mμ (E=5,400).

*Analysis.*—Calcd. for $C_{21}H_{32}N_2O$ (percent): C, 76.78; H, 9.82; N, 8.5. Found (percent): C, 76.84; H, 9.52; N, 8.4.

EXAMPLE 25

(a) 2-(n-butyryl)androstan-17β-ol-3-one was prepared from 27.68 g. of 17β-(n-butyryloxy)androstan-3-one (M.P. 97–99° C.), 24.3 g. of n-butyric anhydride and 27.1 g. of n-butyric acid in the presence of boron trifluoride according to the manipulative procedure described above in Example 24, part (a). The initial product obtained, 2-(n-butyryl)-17β-(n-butyryloxy)androstan-3-one was saponified by allowing it to stand with 35% sodium hydroxide at room temperature, and the resulting 17β-hydroxy compound was chromatographed on silica gel to give 25.14 g. of 2-(n-butyryl)androstan-17β-ol-3-one, M.P. 130.8–132.8° C. (corr.), colorless prisms from methanol, $[\alpha]_D^{25}$= +55.8±0.1° (1% in chloroform); ultraviolet maximum at 290 mμ (E=9,470).

*Analysis.*—Calcd. for $C_{23}H_{36}O_3$ (percent): C, 76.62; H, 10.07. Found (percent): C, 76.70; H, 10.10.

(b) 17β - hydroxyandrostano[3.2-c] - 5′ - (n-propyl) pyrazole [VI; R is $(CH_2)_2CH_3$, R′ and R″ are H, X is $H_2$, Z is OH, Y and Y′ are $CH_3$] was prepared from 3.00 g. of 2-(n-butyryl)androstan-17β-ol-3-one and 0.55 g. of hydrazine hydrate in 50 ml. of absolute ethanol according to the manipulative procedure described above in Example 5. There was thus obtained 17β-hydroxyandrostano[3.2-c]-5′-(n-propyl)pyrazole, M.P. 169.4–172.0° C. (corr.), needles from ethyl acetate, $[\alpha]_D^{25}$= +56.5 ±0.2° (1% in chloroform); ultraviolet maximum at 224 mμ (E=5,800).

*Analysis.*—Calcd. for $C_{23}H_{36}N_2O$ (percent): C, 77.48; H, 10.18; N, 7.86. Found (percent), C, 77.38; H, 10.20; N, 7.84.

EXAMPLE 26

(a) 2-hydroxymethylene-4,4-dimethyl-5-androsten-17β-ol-3-one was prepared from 6.69 g. of 4,4-dimethyl-5-androsten-17β-ol-3-one, 9.5 ml. of ethyl formate, 0.95 g. of sodium and 18–20 ml. of ethanol in 65 ml. of pyridine according to the manipulative procedure described above in Example 16, part (a). There was thus obtained 5.21 g. of 2 - hydroxymethylene-4,4-dimethyl-5-androsten-17β-ol-3-one.

(b) 4,4-dimethyl-17β - hydroxy - 5-androsteno[3,2-c] pyrazole was prepared from 2.07 g. of 2-hydroxymethylene-4,4-dimethyl-5-androsten-17β-ol - 3 - one and 0.88 ml. of hydrazine hydrate in 70 ml. of ethanol according to the manipulative procedure described above in Example 5. The product was recrystallized from aqueous ethanol and dried over phosphorus pentoxide for two days at 60° C. to give 4,4 - dimethyl - 17β - hydroxy - 5-androsteno[3,2-c]pyrazole, M.P. 231.0–233.6° C. (corr.), $[\alpha]_D^{25}$=−20.1±0.4° (1% in chloroform); ultraviolet maximum at 224 mμ (E=5,500).

*Analysis.*—Calcd. for $C_{22}H_{32}ON_2$ (percent): C, 77.60; H, 9.47; N, 8.20. Found (percent): C, 78.17; H, 9.69; N, 8.40.

EXAMPLE 27

(a) 2-hydroxymethylene-4,4,17α - trimethylandrostan-17β-ol-3-one was prepared from 6 g. of 4,4,17α-trimethylandrostan-17β-ol-3-one, 10 ml. of ethyl formate, 0.85 g. of sodium and 15 ml. of ethanol in 125 ml. of pyridine according to the manipulative procedure described above in Example 16, part (a). There was thus obtained 5.0 g. of 2-hydroxymethylene-4,4,17α-trimethylandrostan - 17β-ol-3-one, M.P. 150–154° C. (uncorr.).

(b) 4,4,17α-trimethyl-17β - hydroxyandrostano[3.2-c] pyrazole was prepared from 2.5 g. of 2-hydroxymethylene-4,4,17α-trimethylandrostan-17β-ol-3-one and 0.36 g. of hydrazine hydrate in 50 ml. of methanol according to the manipulative procedure described above in Example 5. There was thus obtained 2.25 g. of 4,4,17α-trimethyl-17β - hydroxyandrostano[3.2 - c]pyrazole, M.P. 269.2–274.6° C. (corr.) when recrystallized from methanol; $[\alpha]_D^{25}$=+4.7±0.1° (1% in 95% ethanol); ultraviolet maximum at 223 mμ (E=4,930).

*Analysis.*—Calcd. for $C_{23}H_{36}N_2O$ (percent): C, 77.48; H, 10.18; N, 7.86. Found (percent): C, 77.46; H, 10.21; N, 7.99.

EXAMPLE 28

(a) 2-hydroxymethylene-6α,17α-dimethyl-4-androsten-17β-ol-3-one was prepared from 5.0 g. of 6α,17α-dimethyl-4-androsten-17β-ol-3-one, 5.0 ml. of ethyl formate and 1.5 g. of sodium hydride in 100 ml. of benzene according to the manipulative procedure described above in Example 2.

(b) 6α,17α-dimethyl-17β-hydroxy-4-androsteno[3.2-c] pyrazole was prepared from the entire crude product from part (a) above (about 4–5 g.) and 1.0 g. of hydrazine hydrate in 50 ml. of absolute ethanol according to the manipulative procedure described above in Example 5. The product was recrystallized from ethyl acetate to give 3.39 g. of 6α,17α-dimethyl-17β-hydroxy-4-androsteno[3.2-c]pyrazole, needles, M.P. 170.0–178.6° C. (dec.) (corr.); ultraviolet maximum at 262 mμ (E=9,200).

*Analysis.*—Calcd. for $C_{22}H_{32}N_2O$ (percent): C, 77.60; H, 9.47; N, 8.23. Found (percent): C, 77.30; H, 9.69; N, 8.33.

EXAMPLE 29

(a) Allopregnan-3β - ol - 20 - one 20 - ethylene glycol ketal.—A mixture of 27.4 g. (0.086 mole) of allopregnan-3β-ol-20-one, 33 ml. of ethylene glycol, 700 ml. of benzene and 1 g. of p-toluenesulfonic acid was refluxed for seventy-eight hours with a water separator in the system. The reaction mixture was then cooled and shaken with 100 ml. of 2 N sodium hydroxide solution, and the resulting mixture was filtered to collect 20.5 g. of allopregnan-3β-ol-20-one 20-ethylene glycol ketal, M.P. 166–169° C. (uncorr.). When the latter was recrystallized from acetone, the compound was obtained in the form of colorless plates, M.P. 172.5–175° C. (uncorr.).

(b) Allopregnane - 3,20 - dione 20 - ethylene glycol ketal.—Chromic oxide (26.6 g.) was added in small portions to 425 ml. of pyridine at 25–30° C. To this mixture was added all at once a solution of 19.5 g. (0.054 mole) of allopregnan-3β-ol-20-one 20-ethylene glycol ketal in 250 ml. of pyridine. The reaction mixture was stirred at room temperature for eighteen hours, diluted with 1 liter of hot benzene and filtered. The filtered solid was washed with 500 ml. of hot benzene, and the combined filtrates were washed with four 500 ml. portions of water followed by one 200 ml. portion of saturated sodium chloride solution. The organic solvent was then concentrated in vacuo, and the residue was triturated with 50 ml. of methanol. Filtration of the mixture and concentration of the filtrate to a volume of 20 ml. gave a small additional amount of solid product. The combined solid product was recrystallized from ethyl acetate using activated charcoal for decolorizing purposes to give 12.6 g. of allopregnane-3,20-dione 20-ethylene glycol ketal in the form of blades and plates, M.P. 190–191.5° C. (uncorr.).

(c) 2-hydroxymethyleneallopregnane-3,20 - dione 20-ethylene glycol ketal was prepared from 2.45 g.

of allopregnane-3,20-dione 20-ethylene glycol ketal, 20 ml. of ethyl formate, and sodium methoxide (from 0.33 g. of sodium and 15 ml. of methanol) in 70 ml. of pyridine according to the manipulative procedure described above in Example 16, part (a). There was thus obtained 2.64 g. of 2-hydroxymethyleneallopregnane-3,20-dione 20-ethylene glycol ketal, used in the next reaction without further purification.

A solution of 2.5 g. of 2-hydroxymethyleneallopregnane-3,20-dione 20-ethylene glycol ketal and 2 ml. of 2 N hydrochloric acid in 50 ml. of ethanol was warmed at 50° C. for fifteen minutes and heated to boiling for two minutes. The solution was then concentrated and the residue recrystallized from a methylene chloride-ether-pentane (1:1:2) mixture and finally from a methylene chloride-pentane mixture to give 2-hydroxymethylene-allopregnane-3,20-dione, M.P. 198.6–203.2° C. (corr.), $[\alpha]_D^{25} = +137.2 \pm 0.1°$ (1% in chloroform).

*Analysis.*—Calcd. for $C_{22}H_{32}O_3$ (percent): C, 76.70; H, 9.36. Found (percent): C, 76.41; H, 9.23.

(d) 20-oxoallopregnano[3.2 - c]pyrazole 20 - ethylene glycol ketal was prepared from 2.56 g. of 2-hydroxymethyleneallopregnane-3,20 - dione 20 - ethylene glycol ketal and 0.50 g. of hydrazine hydrate in 20 ml. of ethanol according to the manipulative procedure described above in Example 5. There was thus obtained 2.1 g. of 20-oxoallopregnano[3.2-c]pyrazole 20-ethylene glycol ketal.

(e) 20-oxoallopregnano[3.2-c]pyrazole [VI; R and R' are H, R" is $COCH_3$, X is $H_2$, Z is H, Y and Y' are $CH_3$].—The 20-oxallopregnanol[3.2-c]pyrazole 20-ethylene glycol ketal obtained in part (d) above was suspended in 60 ml. of ethanol and 3 ml. of 2 N hydrochloric acid was added with stirring. After the solid had dissolved (about two minutes), 4 ml. of water was added and the solution allowed to stand for twenty minutes. The solution was then made basic with dilute ammonium hydroxide and 125 ml. of water was added. The solid product was collected by filtration and recrystallized twice from ethanol to give 1.4 g. of 20 - oxoallopregnano[3.2 - c] pyrazole in the form of colorless blades, M.P. 250–263.8° C. (corr.), $[\alpha]_D^{25} = +135.9 \pm 0.1$- (1% in chloroform).

*Analysis.*—Calcd. for $C_{22}H_{32}N_2O$ (percent): C, 77.60; H, 9.47; N, 8.23. Found (percent): C, 77.94; H, 9.44; N, 8.16.

EXAMPLE 30

17α,21 - dihydroxy - 11,20 - dioxo-4-pregneno[3.2-c] pyrazole [VII; R and R' are H, R" is $COCH_2OH$, X is O, Z is OH, Y and Y' are $CH_3$].

(a) Without protection of the 20-oxo group

21 - acetoxy - 4 - pregnen - 17α - ol - 3,11,20 - trione (cortisone acetate) (2.0 g., 0.005 mole) 4.0 ml. of ethyl formate and 1.0 g. of sodium hydride in 100 ml. of pyridine were caused to react according to the manipulative procedure described above in Example 16, part (a), all operations being carried out in a nitrogen atmosphere. In the process the 21-acetoxy group was saponified to give 1.3 g. of 2 - hydroxymethylene - 4-pregnene-17α,21-diol-3,11,20-trione; ultraviolet maxima at 246 and 293 mµ (E=8,000 and 4,300, respectively), characteristic of the 2-hydroxymethylene-Δ⁴-3-oxo grouping.

2 - hydroxymethylene - 4 - pregnene-17α,21-diol-3,11,20 trione (1.3 g.) and 0.2 g. of hydrazine hydrate in 100 ml. of methanol were caused to react according to the manipulative procedure described above in Example 5. There was thus obtained 0.7 g. of 17α,21-dihydroxy-11,20-dioxo-4-pregneno[3.2-c]pyrazole, M.P. above 320° C.; ultraviolet maximum at 260 mµ. The compound gave a positive Tollens test and triphenyltetrazolium test, characteristic of the ketol side chain.

(b) By protection of the 20-oxo group as the 17,20;20,21-bismethylenedioxy derivative (1) 2 - hydroxymethylene - 4 - pregnene-17α,21-diol-3,11,20-trione 17,20;20,21-bismethylenedioxy derivative was prepared from 10.0 g. of 4-pregnene-17α,21-diol-3,11, 20-trione 17,20;20,21-bismethylenedioxy derivative, 15 ml. of ethyl formate and 1.3 g. of sodium hydride according to the manipulative procedure described above in Example 2. There was thus obtained 8.9 g. of 2-hydroxymethylene-4 - pregnene - 17α,21-diol-3,11,20-trione 17,20;20,21-bismethylenedioxy derivative; ultraviolet maxima at 252 and 309 mµ (E=9,700 and 5,500, respectively). This material was used directly in the following reaction.

(2) 17α,21 - dihydroxy - 11,20-dioxo-4-pregneno[3.2-c] pyrazole 17,20;20,21-bismethylenedioxy derivative was prepared from 9.6 g. 2-hydroxymethylene-4-pregnene-17α, 21 - diol - 3,11,20-trione 17,20;20,21-bismethylenedioxy derivative and 4.0 ml. of hydrazine hydrate in 250 ml. of ethanol according to the manipulative procedure described above in Example 5. There was thus obtained 8.2 g. of 17α,21 - dihydroxy - 11,20 - dioxo - 4 - pregneno[3.2-c] pyrazole 17,20;20,21-bismethylenedioxy derivative, M.P. above 300° C. (corr.) when recrystallized from dimethylformamide.

*Analysis.*—Calcd. for $C_{24}H_{30}N_2O_5$ (percent): C, 67.37; H, 6.88; O, 19.10. Found (percent): C, 67.58; H, 7.09; O, 18.76.

(3) 17α,21 - dihydroxy - 11,20-dioxo-4-pregneno[3.2-c] pyrazole was prepared by heating 17α,21-dihydroxy-11,20-dioxo - 4 - pregneno[3.2 - c]pyrazole 17,20;20,21-bismethylenedioxy derivative with dilute formic acid. The product had properties similar to those of the product obtained in part (a) above.

EXAMPLE 31

(a) 20 - oxoallopregnano[3.2 - c] - 1'-methylpyrazole [VI; R is H, R' is $CH_3$, R" is $COCH_3$, X is $H_2$, Z is H, Y and Y' are $CH_3$].—A mixture of 5 g. of 2-hydroxymethyleneallopregnane-3,20-dione 20-ethylene glycol ketal (Example 29, part (c)), 4.8 g. of sodium acetate trihydrate and 2.16 g. of methylhydrazine sulfate in 200 ml. of 95% ethanol was refluxed for one and one-half hours. The crude product which was isolated (4.83 g.) was added to 100 ml. of 95% ethanol and 2 N hydrochloric acid, and the mixture was heated to 45° C. and allowed to stand at room temperature for fifteen minutes. Ammonium hydroxide (10 ml.) was then added, the solution concentrated to dryness, and the residue recrystallized from 85 ml. of methanol to give 5.5 g. of 20-oxoallopregnano [3.2-c]-1'-methylpyrazole, M.P. 188–206° C. (uncorr.). After chromatography on silica gel and another recrystallization from methanol, a sample having the M.P. 194–211° C. (uncorr.) was obtained, $[\alpha]_D^{25} = +136.0 \pm 0.2°$ (1% in chloroform); ultraviolet maximum at 232 mµ (E=6,507).

*Analysis.*—Calcd. for $C_{23}H_{34}N_2O$ (percent): C, 77.92; H, 9.67; N, 7.90. Found (percent): C, 78.10; H, 9.69; N, 7.81.

(b) A mixture of 2.25 g. of 20-oxoallopregnano[3.2-c]-1'-methylpyrazole and 15 ml. of methyl iodide in 20 ml. of methanol was heated for three hours at 100° C. in a bomb tube. The product was isolated and recrystallized from methanol to give 1.8 g. of the methiodide salt of 20-oxoallopregnano[3.2-c]-1'-methylpyrazole in the form of yellow needles, M.P. 277.6–295.8° C. (dec.)(corr.), $[\alpha]_D^{25} = +97.1 \pm 0.1°$ (0.5% in methanol).

*Analysis.*—Calcd. for $C_{24}H_{37}IN_2O$ (percent): C, 58.05; H, 7.51; I, 25.56. Found (percent): C, 58.14; H, 7.52; I, 25.60.

EXAMPLE 32

4,4-dimethyl-20-oxo-5-pregneno[3.2-c]pyrazole can be prepared by introduction of a hydroxymethylene group into the 2-position of 4,4-dimethyl-5-pregnene-3,20-dione 20-ethylene glycol ketal (see copending Clinton et al. application, Ser. No. 643,258 now U.S. Pat. 3,120,516) according to the manipulative procedure described above in Example 1, part (a), followed by reacting the resulting product with hydrazine according to the manipulative procedure described above in Example 1, part (b), and

EXAMPLE 33

17β - hydroxy-17α-methylandrostano[3.2-c]-N-guanylpyrazole [VI; R is H, R' is C(=NH)NH₂, R" is CH₃, X is H₂, Z is OH, Y and Y' are CH₃] can be prepared by replacement of the hydrazine hydrate in Example 1, part (b) by a molar equivalent amount of aminoguanidine.

EXAMPLE 34

17β - hydroxy - 17α - propargylandrostano[3.2 - c]pyrazole [VI; R and R' are H, R" is —CH₂C≡CH, X is H₂, Z is OH, Y and Y' are CH₃] can be prepared by introduction of a hydroxymethylene group into the 2-position of 17α-propargylandrostan-17β-ol-3-one according to the manipulative procedure described above in Example 1, part (a), followed by reacting the resulting product with hydrazine according to the manipulative procedure described above in Example 1, part (b).

EXAMPLE 35

20,21-dihydroxy-4-pregneno[3.2-c]pyrazole [VII; R and R' are H, R" is C(OH)CH₂OH, X is H₂ Z is H, Y and Y' are CH₃] can be prepared by introduction of a hydroxymethylene group into the 2-position of 4-pregnene-20,21-diol-3-one according to the manipulative procedure described above in Example 1, part (a), followed by reacting the resulting product with hydrazine according to the manipulative procedure described above in Example 1, part (b).

EXAMPLE 36

9 - fluoro - 17α,21-dihydroxy-11,20-dioxo-4-pregneno[3.2-c]pyrazole can be prepared by introduction of a hydroxymethylene group into the 2-position of 9-fluoro-4-pregnene-17α,21-diol-3,11,20-trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrogen chloride.

EXAMPLE 37

16α,17α,21 - trihydroxy - 20-oxo-9β,11β-oxido-4-pregneno[3.2-c]pyrazole can be prepared by introduction of a hydroxymethylene group into the 2-position of 4-pregnene-16α,17α,21-triol-3,20-dione-9β,11β-oxide 16α,21-diacetate 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrogen chloride.

EXAMPLE 38

17α,21 - dihydroxy-11,20-dioxo-1,4-pregnadieno[3.2-c]pyrazole can be prepared by introduction of a hydroxymethylene group into the 2-position of 4-pregnene-17α,21-diol-3,11,20-trione 20-monoethylene glycol ketal according to the manipulative procedure described above in Example 1, part (a), reacting the resulting product with sulfonyl chloride to produce 2-chloro-2-formyl-4-pregnene - 17α,21 - diol-3,11,20-trione 20-monoethylene glycol ketal, heating the latter with collidine to effect dehydrochlorination to yield 2-formyl-1,4-pregnadiene-17α,21-diol-3,11,20-trione 20-monoethylene glycol ketal, and finally reacting the latter with hydrazine according to the manipulative procedure described above in Example 1, part (b), and hydrolyzing the ketal group by heating with dilute ethanolic hydrogen chloride.

EXAMPLE 39

(a) 2 - hydroxymethylene-4-pregnene-20,21-diol-3-one 20,21-acetonide was prepared from 1.55 g. of 4-pregnene-20,21-diol-3-one 20,21-acetonide (α-form, M.P. 122–124° C.), 10 ml. of ethyl formate and 0.48 g. of sodium hydride according to the manipulative procedure described above in Example 2. The total crude product was used directly in the following reaction.

(b) 20,21-dihydroxy-4-pregneno[3.2-c]pyrazole 20,21-acetonide was prepared from the total product from part (a) above and 0.30 g. of hydrazine hydrate in 15 ml. of ethanol according to the manipulative procedure described above in Example 5. The product was recrystallized from methanol to give 0.6 g. of 20,21-dihydroxy-4-pregneno-[3.2-c]pyrazole 20,21-acetonide in the form of yellow blades, M.P. 201–204° C. (uncorr.); ultraviolet maximum at 261 mμ (E=9,900).

EXAMPLE 40

(a) 2 - hydroxymethylene-17α-methyl-4-androsten-17β-ol-3-one in the form of the copper chelate (2.07 g., M.P. 205–220° C.) was brominated with 1.46 g. of bromine in 100 ml. of carbon tetrachloride to give 2-bromo-2-hydroxymethylene - 17α - methyl-4-androsten-17β-ol-3-one. The latter can be dehydrobrominated by heating with collidine to give 2-formyl-17α-methyl-1,4-androstadien-17β-ol-3-one.

(b) 17β - hydroxy-17α-methyl-1,4-androstadieno[3.2-c]pyrazole can be prepared by reacting 2-formyl-17α-methyl-1,4-androstadien-17β-ol-3-one with hydrazine in ethanol solution according to the manipulative procedure described above in Example 5.

EXAMPLE 41

17α - methyl-17β-hydroxyandrostano[3.2-c]-2'-methylpyrazole [VI; R is H, R' and R" are CH₃, X is H₂, Z is OH, Y and Y' are CH₃].—A mixture of 8.52 g. of 2-hydroxymethylene-17α-methyl-androstan-17β-ol-3 - one and 2.31 g. of methylsemicarbazide

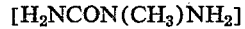

was heated in n-butyl alcohol solution on a steam bath for four hours. There was then added 5 ml. of water, and the mixture was refluxed for eighteen hours and concentrated in vacuo. The residue was dissolved in methylene dichloride, and the solution was washed with water, dried with sodium sulfate and concentrated to dryness. The residue was triturated with ether, and the resulting crystalline product was heated in a nitrogen atmosphere for six hours at 205° C. to effect cyclization. The resulting product was dissolved in benzene and chromatographed on a column of alumina. The column was eluted with benzene containing increasing amounts of ether. The crystalline product was isolated from eluants containing 20% ether and recrystallized from acetone to give 17α-methyl-17β-hydroxyandrostano[3,2-c]-2'-methylpyrazole, M.P. 186.6–198.0° C. (corr.), [α]$_D^{25}$=+38.3° (1% in ethanol); ultraviolet maxima at 229 and 270 mμ (E=4,932 and 100, respectively).

*Analysis.*—Calcd. for $C_{20}H_{34}N_2O$ (percent): C, 77.14; H, 10.01; N, 8.18. Found (percent): C, 77.24; H, 10.17; N, 8.09.

EXAMPLE 42

According to the methods described in the preceding examples, 21-acetoxy-4-pregnene-11β,17α-diol-3,20-dione 20-monoethylene glycol ketal (hydrocortisone acetate 20-monoethylene glycol ketal) reacts with ethyl formate and sodium hydride in benzene or pyridine solution to give the 2-hydroxymethylene derivative, and the latter reacts with hydrazine hydrate to give 21-acetoxy-11β,17α-dihydroxy-20 - oxo - 4 - pregneno[3.2-c]pyrazole 20-monoethylene glycol ketal, which is hydrolyzed with methanolic potassium hydroxide to saponify the 21-acetate and then with dilute hydrochloric acid to cleave the ketal grouping, giving 11β,17α,21-trihydroxy-20-oxo-4-pregneno[3.2-c]pyrazole [VII; R and R' are H, R" is COCH₂OH, X is (H)(OH), Z is OH, Y and Y' are CH₃] with a melting point above 300° C. and an ultraviolet absorption maxi-

EXAMPLE 43

17α,21-dihydroxy - 11,20 - dioxo - 4,6 - pregnadieno-[3.2-c]pyrazole [VIII; R and R' are H, R" is COCH$_2$OH, X is O, Z is OH, Y and Y' are CH$_3$] can be prepared by introduction of a hydroxymethylene group into the 2-position of 21-acetoxy - 4,6 - pregnadien -17α-ol-3,11,20-trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 44

17α,21-dihydroxy-20-oxo - 4 - pregneno[3.2-c]pyrazole [VII; R and R' are H, R" is COCH$_2$OH, X is H$_2$, Z is OH, Y and Y' are CH$_3$] can be prepared by introduction of a hydroxymethylene group into the 2-position of 21-acetoxy-4-pregnen-17α-ol-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 45

17α,21-dihydroxy-11,20-dioxo - 6 - methyl-4-pregneno-[3.2-c]pyrazole can be prepared by introduction of a hydroxymethylene group into the 2-position of 21-acetoxy - 6 - methyl-4-pregnen-17α-ol-3,11,20-trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 46

17α,21 - dihydroxy - 11,20 - dioxo-9-fluoro-6-methyl-4-pregneno[3.2-c]pyrazole can be prepared by introduction of a hydroxymethylene group into the 2-position of 21-acetoxy-9-fluoro-6-methyl - 4 - pregnen - 17α - ol-3,11,20-trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 47

2 - methyl - 17α,21 - dihydroxy - 11,20 - dioxo-4-pregneno[3.2-c]pyrazole can be prepared by introduction of a hydroxymethylene group into the 2-position of 21-acetoxy - 2 - methyl - 4 - pregnen - 17α-ol-3,11,20-trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 48

2 - methyl - 11β,16α,17α,21 - tetrahydroxy - 20 - oxo-4-pregneno[3.2-c]pyrazole can be prepared by introduction of a hydroxymethylene group into the 2-position of 21-acetoxy-2-methyl-4-pregnene 11β,16α,17α-triol-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 49

16α,17α,21 - trihydroxy - 11,20 - dioxo - 4 - pregneno-[3.2-c]pyrazole can be prepared by introduction of a hydroxymethylene group into the 2-position of 16α,21-diacetoxy-4-pregnene - 17α-ol - 3,11,20 - trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 50

4,17(20)-pregnadiene-11β,21-diol-3-one can be caused to react first with ethyl formate and sodium hydride and then with hydrazine, according to the methods of the preceding examples, to give 11β,21-dihydroxy-4,17(20)-pregnadieno[3.2-c]pyrazole. The latter reacts with potassium cyanate in acid solution according to the procedure described above in Example 9, part (c) to give the N-carbamyl derivative, which, in turn, reacts with phenyl iodosoacetate and osmium tetroxide in aqueous pyridine, or with morpholine oxide peroxide and osmium tetroxide in aqueous pyridine to give 11β,17α,21-trihydroxy-20-oxo-4-pregneno[3.2-c]pyrazole-N-carboxamide [VII; R is H, R' is CONH$_2$, R" is COCH$_2$OH, X is (H)(OH), Z is OH, Y and Y' are CH$_3$]. The latter can be hydrolyzed under mild acid conditions to remove the N-carbamyl group, to give 11β,17α,21-trihydroxy-20-oxo-4-pregneno-[3.2-c]pyrazole.

EXAMPLE 51

11β,17α,21-trihydroxy - 20 - oxo - 4 - pregneno[3.2-c]pyrazole-N-carboxamide can be caused to react with p-toluenesulfonyl chloride in pyridine under mild conditions to give 21-tosyloxy - 11β,17α - dihydroxy-20-oxo-4-pregneno-[3.2-c]pyrazole-N-carboxamide. The latter reacts with sodium bromide, sodium iodide, sodium chloride or sodium thiocyanate to give, respectively, the 21-bromo, 21-iodo, 21-chloro or 21-thiocyano derivatives of 11β,17α-dihydroxy-20-oxo - 4 - pregneno[3.2-c]pyrazole - N - carboxamide.

EXAMPLE 52

6β,17β - dihydroxyandrostano[3.2 - c]pyrazole can be prepared by introduction of a hydroxymethylene group into the 2-position of androstane - 6β,17β - diol - 3 - one according to the manipulative procedure described above in Example 1, part (a), followed by reacting the resulting product with hydrazine according to the manipulative procedure described above in Example 1, part (b).

EXAMPLE 53

17α - ethynyl - 17β - hydroxy - 11 - oxo-4-androsteno-[3.2-c]pyrazole [VII; R and R' are H, R" is C≡CH, X is O, Z is OH, Y and Y' are CH$_3$] can be prepared by introduction of a hydroxymethylene group into the 2-position of 17α - ethynyl - 4 - androsten-17β-ol-3,11-dione according to the manipulative procedure described above in Example 1, part (a), followed by reacting the resulting product with hydrazine according to the manipulative procedure described above in Example 1, part (b).

EXAMPLE 54

17α-methyl-17β-hydroxy-11-oxo - 4 - androsteno[3.2-c] pyrazole [VII; R and R' are H, R" is CH$_3$, X is O, Z is OH, Y and Y' are CH$_3$] can be prepared by introduced of a hydroxymethylene group into the 2-position of 17α-methyl-4-androsten-17β-ol-3,11-dione according to the manipulative procedure described above in Example 1, part (a), followed by reacting the resulting product with hydrazine according to the manipulative procedure described above in Example 1, part (b).

EXAMPLE 55

17β-hydroxy-11-oxo-4-androsteno[3.2-c]pyrazole [VII; R, R' and R" are H, X is O, Z is OH, Y and Y' are CH$_3$] can be prepared by introduction of a hydroxymethylene group into the 2-position of 4-androsten-17β-ol-3,11-dione according to the manipulative procedure described above in Example 1, part (a), followed by reacting the resulting product with hydrazine according to the manipulative procedure described above in Example 1, part (b).

EXAMPLE 56

6β,17β-dihydroxy-4-androsteno[3.2-c]pyrazole can be prepared by introduction of a hydroxymethylene group into the 2-position of 4-androstene-6β,17β-diol-3-one according to the manipulative procedure described above in Example 1, part (a), followed by reacting the resulting product with hydrazine according to the manipulative procedure described above in Example 1, part (b).

EXAMPLE 57

17α-methyl-6β,17β-dihydroxy - 4 - androsteno[3.2 - c] pyrazole can be prepared by introduction of a hydroxymethylene group into the 2-position of 17α-methyl-4-androstene-6β,17β-diol-3-one according to the manipulative procedure described above in Example 1, part (a), followed by reacting the resulting product with hydrazine according to the manipulative procedure described above in Example 1, part (b).

EXAMPLE 58

14α,17β-dihydroxy-4-androsteno[3.2-c]pyrazole can be prepared by introduction of a hydroxymethylene group into the 2-position of 4-androstene-14α,17β-diol-3-one according to the manipulative procedure described above in Example 1, part (a), followed by reacting the resulting product with hydrazine according to the manipulative procedure described above in Example 1, part (b).

EXAMPLE 59

16β-methyl-17β-hydroxy-4-androsteno[3.2 - c]pyrazole can be prepared by introduction of a hydroxymethylene group into the 2-position of 16β-methyl-4-androsten-17β-ol-3-one according to the manipulative procedure described above in Example 1, part (a), followed by reacting the resulting product with hydrazine according to the manipulative procedure described above in Example 1, part (b).

EXAMPLE 60

11α,17β-dihydroxy-4-androsteno[3.2 - c]pyrazole [VII; R, R' and R" are H, X is (H)(OH), Z is OH, Y and Y' are CH$_3$] can be prepared by introduction of a hydroxymethylene group into the 2-position of 4-androstene-11α, 17β-diol-3-one according to the manipulative procedure described above in Example 1, part (a), followed by reacting the resulting product with hydrazine according to the manipulative procedure described above in Example 1, part (b).

EXAMPLE 61

6β,17β-dihydroxy-19-nor-4-androsteno[3.2 - c]pyrazole can be prepared by introduction of a hydroxymethylene group into the 2-position of 19-nor-4-androstene-6β,17β-diol-3-one according to the manipulative procedure described above in Example 1, part (a), followed by reacting the resulting product with hydrazine according to the manipulative procedure described above in Example 1, part (b).

EXAMPLE 62

4-bromo-17α-methyl-17β-hydroxy-4-androsteno[3.2 - c] pyrazole can be prepared by introduction of a hydroxymethylene group into the 2-position of 4-bromo-17α-methyl-4-androsten-17β-ol-3-one according to the manipulative procedure described above in Example 1, part (a), followed by reacting the resulting product with hydrazine according to the manipulative procedure described above in Example 1, part (b).

EXAMPLE 63

4-methyl-17β-hydroxy-4-androsteno[3.2-c]pyrazole can be prepared by introduction of a hydroxymethylene group into the 2-position of 4-methyl-4-androsten-17β-ol-3-one according to the manipulative procedure described above in Example 1, part (a), followed by reacting the resulting product with hydrazine according to the manipulative procedure described above in Example 1, part (b).

EXAMPLE 64

2α,17α-dimethyl-17β-hydroxy - 4 - androsteno[3.2 - c] pyrazole can be prepared by introduction of a hydroxymethylene group into the 2-position of 2α,17α-dimethyl-4-androsten-17β-ol-3-one according to the manipulative proedure described above in Example 1, part (a), followed by reacting the resulting product with hydrazine according to the manipulative procedure described above in Example 1, part (b).

EXAMPLE 65

17α-ethynyl-17β-hydroxy - 4,6 - androstadieno[3.2-c] pyrazole [VIII; R and R' are H, R" is C≡CH, X is H$_2$, Z is OH, Y and Y' are CH$_3$] can be prepared by introduction of a hydroxymethylene group into the 2-position of 17α-ethynyl-4,6-androstadien-17β-ol-3-one according to the manipulative procedure described above in Example 1, part (a), followed by reacting the resulting product with hydrazine according to the manipulative procedure described above in Example 1, part (b).

EXAMPLE 66

6β,17α,21 - trihydroxy-20-oxoallopregnano[3.2 - c]pyrazole can be prepared by introduction of a hydroxymethylene group into the 2-position of allopregnane-6β, 17α,21-triol-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 67

12α,17α,21-trihydroxy-20-oxo - 4 - pregneno[3.2-c]pyrazole can be prepared by introduction of a hydroxymethylene group into the 2-position of 21-acetoxy-4-pregnene-12α,17α-diol-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 68

17α,21 - dihydroxy - 12,20 - dioxoallopregnano[3.2-c] pyrazole can be prepared by introduction of a hydroxymethylene group into the 2-position of 21-acetoxyallopregnan - 17α - ol - 3,12,20 - trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 69

20 - oxo - 4,11 - pregnadieno[3.2-c]pyrazole can be prepared by introduction of a hydroxymethylene group into the 2-position of 4,11-pregnadiene-3,20-dione 20-monoethylene glycol ketal according to the manipulative procedure described above in Example 1, part (a), followed by reacting the resulting product with hydrazine

EXAMPLE 70

17α - hydroxy - 20 - oxo - 4-pregneno[3.2-c]pyrazole [VII; R and R' are H, R'' is COCH₃, X is H₂, Z is OH, Y and Y' are CH₃] can be prepared by introduction of a hydroxymethylene group into the 2-position of 4-pregnen - 17α - ol-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 71

17α - methyl - 20-oxo-4-pregneno[3.2-c]pyrazole can be prepared by introduction of a hydroxymethylene group into the 2-position of 17α-methyl-4-pregnene-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 72

6β - hydroxy - 20 - oxo-4-pregneno[3,2-c]pyrazole can be prepared by introduction of a hydroxymethylene group into the 2-position of 4 - pregnen - 6β-ol-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 73

7β,11β-dihydroxy - 20 - oxo - 4 - pregneno[3.2-c]pyrazole can be prepared by introduction of a hydroxymethylene group into the 2-position of 4-pregnene-7β,11β-diol-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 74

12α - chloro - 17α,21 - dihydroxy-11,20-dioxo-4-pregneno[3.2-c]pyrazole can be prepared by introduction of a hydroxymethylene group into the 2-position of 12α-chloro - 4 - pregnene - 17α,21 - diol-3,11,20-trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 75

20 - oxo - 18,19 - bisnor - 4 - pregneno[3.2-c]pyrazole can be prepared by introduction of a hydroxymethylene group into the 2-position of 18,19-bisnor-4-pregnene-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 76

4 - bromo - 17α,21 - dihydroxy - 11,20-dioxo-4-pregneno[3.2-c]pyrazole can be prepared by introduction of a hydroxymethylene group into the 2-position of 21-acetoxy - 4 - bromo - 4 - pregnen-17α-ol-3,11,20-trione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 77

7α,12α - dihydroxy - 20 - oxo - 4 - pregneno[3.2-c]pyrazole can be prepared by introduction of a hydroxymethylene group into the 2-position of 4-pregnene-7α,12α-diol-3,20-dione 20-monoethylene glycol ketal according to the manipulative procedure described above in Example 1, part (a), followed by reacting the resulting product with hydrazine according to the manipulative procedure described above in Example 1, part (b) and hydrolyzing the ketal group by heating with dilute ethanolic hydrochloric acid.

EXAMPLE 78

17β - propionoxyandrostano[3.2-c]-N-propionylpyrazole [VI; R is H, R' is CH₃CH₂CO, R'' is H, X is H₂, Z is OCOCH₂CH₃, Y and Y' are CH₃].—17β-hydroxyandrostano[3.2-c]pyrazole (1.80 g. containing 1 mole of ethanol of crystallization) and 1.43 g. of p-toluene-sulfonic acid monohydrate was dissolved in 10 ml. of propionic acid by gentle heating. The solution was cooled to 15° C. and 3.9 ml. of propionic anhydride was added. The reaction mixture was kept below 35° C. and allowed to stand for three hours at room temperature, then diluted with ice and water to a volume of 125 ml. and allowed to stand for two hours. The solid product was filtered, washed with water, sodium bicarbonate solution and again with water. After drying, the product was dissolved in 10 ml. of propionic acid, 1.43 g. of p-toluenesulfonic acid monohydrate was added, and the mixture heated to complete solution. The solution was then cooled, 25 ml. of propionic anhydride was added and the mixture kept at room temperature for twenty-four hours. The reaction mixture was worked up as described above to give 2.25 g. of 17β-propionoxyandrostano[3.2-c]-N-propionylpyrazole, M.P. 178–181° C. (uncorr.) after two recrystallizations from ether.

17β-acetoxy-17α-methylandrostano[3.2-c] - N - acetylpyrazole was obtained by refluxing for thirty minutes a mixture of 2.05 g. of 17β-hydroxyandrostano[3.2-c]pyrazole with 20.0 ml. of acetic anhydride. The product had an ultraviolet maximum at 258 mμ (E=12,500).

EXAMPLE 79

The 7,20-bis(ethylene glycol ketal) of allopregnane-3,7,20-trione (prepared by ketalization of allopregnan-3β-ol-7,20-dione and oxidation by the Oppenauer procedure) can be converted to 7,20-dioxoallopregnano[3.2-c]pyrazole by reacting with ethyl formate and sodium hydride in benzene solution, condensing the resulting 2-hydroxymethylene derivative with hydrazine, and finally cleaving the ketal groupings with dilute acid according to the procedures described hereinabove.

EXAMPLE 80

17α - ethyl - 17β-hydroxy-7-oxoandrostano[3.2-c]pyrazole can be prepared by oxidation of 17α-ethylandrostane-3β,17β-diol-7-one ethylene glycol ketal by the Oppenauer procedure to 17α-ethylandrostan-17β-ol-3,7-dione ethylene glycol ketal, followed by introduction of a hydroxymethylene group into the 2-position, reaction with hydrazine and hydrolysis according to the procedures described hereinabove.

EXAMPLE 81

7-oxoallopregnano[3.2-c]pyrazole can be prepared by oxidation of allopregnan-3β-ol-7-one ethylene glycol ketal by the Oppenauer procedure to allopregnane-3,7-dione 7-monoethylene glycol ketal, followed by introduction of a hydroxymethylene group into the 2-position, reaction with hydrazine and hydrolysis according to the procedures described hereinabove.

EXAMPLE 82

(a) 2 - hydroxymethylene - 17α-methyletiocholan-17β-ol-3-one.—To 4.8 g. (0.2 mole) of sodium hydride suspended in 75 ml. of benzene was added 3.2 g. (0.1 mole) of methanol. After the reaction subsided, the mixture was heated to boiling, cooled, and treated with a mixture of 20.8 g. (0.068 mole) of 17α-methyletiocholan-17β-ol-3-one, 75 ml. of benzene, and 21 ml. of ethyl formate. The mixture was stirred vigorously for four hours, mixed with 200 ml. of water, and the layers were separated. The water layer was washed with ether and then acidified with hydrochloric acid. The resulting precipitate was collected by filtration and dried, giving 17.8 g. of 2-hydroxymethylene-17α-methyletiocholan-17β-ol-3-one, suitable for use in the succeeding reaction. A sample was further purified by chromatography on 100 g. of silica gel in an equal volume mixture of ether and pentane. The resulting solid was recrystallized from ether, giving colorless needles, M.P. 205.6–211.6° C. (corr.), $[\alpha]_D^{25} = +0.3 \pm 0.2°$ (1% in chloroform); ultraviolet maxima at 285 and 347 mμ (E=7,200 and 1,500, respectively).

*Analysis.*—Calcd. for $C_{21}H_{32}O_3$ (percent): C, 75.86; H, 9.70. Found (percent): C, 75.69; H, 9.74.

(b) 17β - hydroxy - 17α-methyletiocholano[3.2-c]pyrazole [VI; R and R' are H, R" is $CH_3$, X is $H_2$, Z is OH, Y and Y' are $CH_3$] was prepared from 2.0 g. of 2- hydroxymethylene-17α-methyletiocholan-17β-ol-3-one and 2 g. of hydrazine hydrate in 25 ml. of ethanol according to the manipulative procedure described above in Example 5. The product was recrystallized from ethyl acetate to give 17β - hydroxy-17α-methyletiocholano[3.2-c]pyrazole in the form of colorless leaflets, M.P. 271.4–279.6° C. (corr.), $[\alpha]_D^{25} = -23 \pm 4°$ (1.19% in chloroform).

*Analysis.*—Calcd. for $C_{21}H_{32}N_2O$ (percent): C, 76.78; H, 9.82; N, 8.53. Found (percent): C, 76.76; H, 9.87; N, 8.73.

A solution of 2.0 g. of 17β-hydroxy-17α-methyl-4-androsteno[3.2-c]pyrazole in 200 ml. of glacial acetic acid was hydrogenated in the presence of 1.0 g. of platinum oxide catalyst. The catalyst was then removed by filtration and the filtrate concentrated in vacuo. The residue was dissolved in 100 ml. of methanol, made basic with concentrated ammonium hydroxide and again concentrated in vacuo. This residue was crystallized from ethyl acetate to give 0.7 g. of product, M.P. 260–265° C. (uncorr.), undepressed upon admixture with a sample of 17β-hydroxy-17α-methyletiocholano[3.2-c]pyrazole prepared as described above. The ultraviolet and infrared spectra of the samples prepared by the two alternative methods were identical. This proved that the hydroxymethylene group had entered the 2-position of 17α-methyletiocholan-17β-ol-3-one in part (a) above.

EXAMPLE 83

(a) 6α,17α-dimethylandrostan-17β-ol-3 - one.—A solution of 10.0 g. of 6α,17α-dimethyl-4-androsten-17β-ol-3-one in 150 ml. of ether and 150 ml. of tetrahydrofuran was added to 1 liter of anhydrous liquid ammonia. Lithium (2.5 g.) was added in small pieces and the mixture was stirred for fifty minutes. There was then added 20 g. of solid ammonium chloride in small portions, the ammonia was evaporated on a steam bath, 2.5 liters of water was added and the mixture stirred for one hour. The solid product which had separated was collected by filtration and dried, giving 9.89 g., M.P. 145–200° C. (uncorr.). The latter product was dissolved in an ether-methylene dichloride-pentane (30:10:60) mixture and chromatographed on 500 g. of silica gel. The chromatographed product was recrystallized from ethyl acetate to give 6α,17α-dimethylandrostan-17β-ol-3-one in the form of colorless prismatic crystals, M.P. 181.6–184.6° C. (corr.), $[\alpha]_D^{25} = +10.3 \pm 0.2°$ (1% in chloroform).

*Analysis.*—Calcd. for $C_{21}H_{34}O_2$ (percent): C, 79.19; H, 10.76. Found (percent): C, 79.43; H, 11.00.

(b) 2 - hydroxymethylene - 6α,17α-dimethylandrostan-17β-ol-3-one was prepared from 3.47 g. of 6α,17α-dimethylandrostan-17β-ol-3-one, 4.04 of ethyl formate and 2.95 g. of sodium methoxide in 125 ml. of benzene according to the manipulative procedure described above in Example 1. part (a). There was thus obtained 2.74 g. of 2-hydroxymethylene-6α,17α-dimethylandrostan-17β-ol-3-one in the form of pale yellow prisms, M.P. 198–199.8° C. (corr.) when recrystallized from acetone; $[\alpha]_D^{25} = +54.3 \pm 0.1°$ (1% in chloroform); ultraviolet maximum at 285 mμ (E=9,200).

*Analysis.*—Calcd. for $C_{22}H_{34}O_3$ (percent): C, 76.26; H, 9.89. Found (percent): C, 75.93; H, 9.63.

(c) 6α,17α - dimethyl-17β-hydroxyandrostano[3.2-c]pyrazole was prepared from 2.0 g. of 2-hydroxymethylene-6α,17α-dimethylandrostan-17β-ol-3-one and 0.35 g. of hydrazine hydrate in 75 ml. of ethanol according to the manipulative procedure described above in Example 5. The product (1.81 g.) was recrystallized from ethyl acetate to give 6α,17α-dimethyl-17β-hydroxyandrostano[3.2-c]pyrazole, M.P. 156.0–174.0° C. (dec.) (corr.), $[\alpha]_D^{25} = +44.8 \pm 0.1°$ (1% in chloroform); ultraviolet maximum at 225 mμ (E=4,900).

*Analysis.*—Calcd. for $C_{22}H_{34}N_2O$ (percent): C, 77.14; H, 10.01; N, 8.18. Found (percent): C, 77.35; H, 10.10; N, 8.28.

EXAMPLE 84

(a) 2 - hydroxymethylene-17α-vinylandrostan-17β-ol-3-one was prepared from 10.70 g. of 17α-vinylandrostan-17β-ol-3-one, 27.1 ml. of ethyl formate and 5.29 g. of sodium hydride according to the manipulative procedure described above in Example 2. There was thus obtained 6.22 g. of 2-hydroxymethylene-17α-vinylandrostan-17β-ol-3-one, used directly without purification in the following reaction.

(b) 17β - hydroxy-17α-vinylandrostano[3.2-c]pyrazole [VI; R and R' are H, R" is $CH=CH_2$, X is $H_2$, Z is OH, Y and Y' are $CH_3$] was prepared from 1.72 g. of 2-hydroxymethylene-17α-vinylandrostan-17β-ol-3-one and 0.63 ml. of hydrazine hydrate in 50 ml. of ethanol according to the manipulative procedure described above in Example 5. The resulting product was recrystallized from ethanol, chromatographed on silica gel and finally recrystallized from aqueous methanol to give 17β-hydroxy-17α-vinylandrostano[3.2-c]pyrazole, M.P. above 300° C. (corr.), $[\alpha]_D^{25} = +24.5 \pm 0.8°$ (1% in chloroform); ultraviolet maximum at 224 mμ (E=7,100).

*Analysis.*—Calcd. for $C_{22}H_{32}N_2O$ (percent): C, 77.60; H, 9.47; N, 8.23; O, 4.70. Found (percent): C, 77.52; H, 9.70; N, 8.00; O, 4.50.

EXAMPLE 85

(a) 2 - hydroxymethylene-17α-ethyl-19-norandrostan-17β-ol-3-one was prepared from 7.00 g. of 17α-ethyl-19-norandrostan-17β-ol-3-one [M.P. 212–215° C. (uncorr.), prepared by lithium-ammonia reduction of 17α-ethyl-19-nor-4-androsten-17β-ol-3-one according to the method described above in Example 83, part (a)], 10 ml. of ethyl formate and 2.40 g. of sodium hydride according to the manipulative procedure described above in Example 2. There was thus obtained 4.0 g. of 2-hydroxymethylene-17α - ethyl-19-norandrostan-17β-ol-3-one, M.P. 77–115° C. (uncorr.), used directly in the following reaction without further purification.

(b) 17α - ethyl-17β-hydroxy-19-norandrostano[3.2-c]-pyrazole [VI; R and R' are H, R" is $C_2H_5$, X is $H_2$, Z is OH, Y is H, Y' is CH₃] was prepared from 3.34 g. of 2-hydroxymethylene-17α-ethyl-19-norandrostan - 17β - ol-3-one and 0.55 g. of hydrazine hydrate in 50 ml. of ethanol according to the manipulative procedure described above in Example 5. The product was chromatographed on silica gel and recrystallized from an ethanol-ethyl acetate mixture to give 1.0 g. of 17α-ethyl-17β-hydroxy-19-norandrostano[3.2-c]pyrazole in the form of colorless prisms, M.P. 149.2–150.4° C. (corr.), $[\alpha]_D^{25} = +93.0 \pm 0.1°$ (1% in pyridine).

*Analysis.*—Calcd. for $C_{21}H_{32}N_2O$ (percent): C, 76.78; H, 9.82; N, 8.53. Found (percent): C, 76.74; H, 9.90; N, 8.28.

EXAMPLE 86

(a) 2 - hydroxymethylenepregnane-3,20-dione.—Sodium methoxide was prepared by dissolving 0.73 g. (0.03 mole) of sodium hydride in 30 ml. of methanol and removing the excess methanol at 100° C. in vacuo. To the sodium methoxide were added 100 ml. of pyridine, 5.45 g. (0.0151 mole) of pregnane-3,20-dione 20-ethylene glycol ketal and then 30 ml. of ethyl formate. The reaction mixture was allowed to stand at room temperature for twenty-one hours and concentrated to dryness in vacuo below 45° C. The residue was dissolved in water, and carbon dioxide was passed into the solution until it reached a pH of 8. The precipitated product was collected by filtration and air dried, giving 5.9 g. of 2-hydroxymethylenepregnane-3,20-dione 20-ethylene glycol ketal, suitable for conversion to the pyrazole derivative.

A 1.5 g. portion of the 2-hydroxymethylenepregnane-3,20-dione 20-ethylene glycol ketal was dissolved in 10 ml. of methanol, 2 ml. of 2 N hydrochloric acid was added, and the mixture was heated to boiling. The solution was set aside and was allowed to cool for one hour, diluted with 6 ml. of water, and the precipitated solid was collected by filtration and chromatographed on 25 g. of silica gel in pentane containing 25% ether. There was thus obtained 0.57 g. of 2-hydroxymethylenepregnane-3,20-dione, M.P. 139.8–146.0° C. when recrystallized from methanol, $[\alpha]_D^{25} = +114.2 \pm 0.3°$ (1% in chloroform).

*Analysis.*—Calcd. for $C_{22}H_{32}O_3$ (percent): C, 76.70; H, 9.36. Found (percent): C, 76.65; H, 9.62.

(b) 20-oxopregnano[3.2-c]pyrazole [VI; R and R' are H, R'' is COCH₃, X is H₂, Z is H, Y and Y' are CH₃] was prepared from 7.5 g. of 2-hydroxymethylenepregnane-3,20-dione and 1.5 g. of hydrazine hydrate in 50 ml. of ethanol according to the manipulative procedure described above in Example 5. The product was chromatographed on silica gel and then recrystallized from methanol and a chloroform-methanol mixture to give 20-oxopregnano[3.2-c]pyrazole in the form of colorless prisms, M.P. 231.2–253.0° C. (corr.), $[\alpha]_D^{25} = +91.6 \pm 0.1°$ (1% in chloroform).

*Analysis.*—Calcd. for $C_{22}H_{23}N_2O$ (percent): C, 77.60; H, 9.47; N, 8.23. Found (percent): C, 77.48; H, 9.63; N, 8.08.

EXAMPLE 87

(a) 2-hydroxymethylene - 17α - ethynylandrostan-17β-ol-3-one was prepared from 3.14 g. of 17α-ethynylandrostan-17β-ol-3-one, 4.8 ml. of ethyl formate, sodium methoxide (from 0.46 g. of sodium and 8–10 ml. of methanol) in 100 ml. of pyridine according to the manipulative procedure described above in Example 16, part (a). There was thus obtained 2.48 g. of 2 - hydroxymethylene-17α-ethynylandrostan-17β-ol-3-one, used directly in the following reaction without further purification.

(b) 17α-ethynyl - 17β - hydroxyandrostano[3.2-c]pyrazole [VI; R and R' are H, R'' is C≡CH, X is H₂, Z is OH, Y and Y' are CH₃] was prepared from 2.40 g. of 2-hydroxymethylene-17α-ethynylandrostan - 17β - ol-3-one and 1.02 ml. of hydrazine hydrate in 90 ml. of ethanol according to the manipulative procedure described above in Example 5. The product was recrystallized from ethanol to give 1.58 g. of 17α - ethynyl-17β-hydroxyandrostano[3.2-c]pyrazole, M.P. 237.4–242.0° C. (corr.), $[\alpha]_D^{25} = +12.4 \pm 0.1°$ (1% in chloroform; ultraviolet maximum at 223 mμ (E=5,100).

*Analysis.*—Calcd. for $C_{22}H_{30}N_2O$ (percent): C, 78.06; H, 8.93; N, 8.28. Found (percent): C, 77.87; H, 9.20; N, 8.37.

EXAMPLE 88

(a) 2 - hydroxymethylene-17α-allyl-4-androsten-17β-ol-3-one was prepared from 7.3 g. of 17α-allyl-4-androsten-17β-ol-3-one (prepared by reacting dehydroepiandrosterone with allylmagnesium bromide followed by chromic acid oxidation of the 3-hydroxy group), 12 ml. of ethyl formate and sodium methoxide (from 1.2 g. of sodium in methanol) in 60 ml. of pyridine according to the manipulative procedure described above in Example 16, part (a). The crude product was used directly in the following reaction without purification.

(b) 17α-allyl - 17β - hydroxy - 4 - androsteno[3.2-c]pyrazole [VII; R and R' are H, R'' is CH₂CH=CH₂, X is H₂, Z is OH, Y and Y' are CH₃] was prepared from 2.0 g. of 2 - hydroxymethylene-17α-allyl-4-androsten-17β-ol-3-one and 1 ml. of hydrazine hydrate in 70 ml. of ethanol according to the manipulative procedure described above in Example 5. The product was recrystallized from ethanol to give 17α - allyl - 17β - hydroxy - 4 - androsteno[3.2-c]pyrazole in the form of colorless prisms, M.P. 239.8–248.2° C. (corr.), $[\alpha]_D^{25} = +93.7 \pm 0.1°$ (1% in chloroform); ultraviolet maximum at 260 mμ (E=10,500).

*Analysis.*—Calcd. for $C_{23}H_{32}N_2O$ (percent): C, 78.36; H, 9.15; O, 4.54. Found (percent): C, 78.28; H, 9.48; O, 4.80.

EXAMPLE 89

(a) 5α,6α - epoxy - 17α - propynylandrostane-3β,17β-diol 3-acetate.—A mixture of 2.82 g. of 17α-propynyl-5-androstene-3β,17β-diol 3-acetate [M.P. 195.4–201.2° C. (corr.), $[\alpha]_D^{25} = -117.8 \pm 0.1°$ (1% in chloroform), prepared from 5-androsten-3β-ol-17-one and propynylmagnesium bromide, followed by acetylation with acetic anhydride in pyridine], 13.5 ml. of peracetic acid and 2.00 g. of sodium acetate trihydrate in 200 ml. of chloroform was allowed to react at room temperature for about two days. The reaction mixture was then washed successively with 250 ml. of water, 250 ml. of 5% sodium carbonate solution, 250 ml. of 1 N sodium hydroxide solution and 250 ml. of water. The washings were back extracted with ether, and the ether was successively washed with 100 ml. of water, 100 ml. of 1 N sodium hydroxide solution, 100 ml. of water and 100 ml. of sodium chloride solution. The combined organic solutions were dried and concentrated, and the residue was dissolved in pentane containing 10% ether and chromatographed on silica gel. The chromatographed product was recrystallized from ethyl acetate to give 5α,6α - epoxy - 17α - propynylandrostane-3β,17β-diol 3-acetate in the form of colorless prisms, M.P. 244.6–250.6° C. (corr.), $[\alpha]_D^{25} = -111.3 \pm 0.1°$ (1% in chloroform).

*Analysis.*—Calcd. for $C_{24}H_{34}O_4$ (percent): C, 74.57; H, 8.87. Found (percent): C, 74.74; H, 8.95.

(b) 6β - methyl - 17α - propynylandrostane-3β,5α,17β-triol.—Methylmagnesium iodide was prepared from 36.28 g. of magnesium and 215.4 g. of methyl iodide in 625 ml. of ether. The ether was gradually removed by distillation and replaced with benzene. A solution of 34.13 g. of 5α,6α-epoxy - 17α - propynylandrostane - 3β,17β - diol 3-acetate in 2500 ml. of benzene was then added, and the mixture was refluxed for two and one-half hours. Saturated ammonium chloride solution (250 ml.) was added, the mixture was filtered and the benzene solution concentrated. The residue was extracted with ethyl acetate and the total organic product isolated, giving about 20 g. of 6β - methyl - 17α - propynylandrostane-3β,5α,17β-triol in the form of colorless rods, M.P. 212–213.5° C. (uncorr.) when recrystallized from ethyl acetate.

(c) 6β - methyl - 17α - propynylandrostane-5α,17β-diol - 3 - one.—A mixture of 18.2 mg. of 6β-methyl-17α-propynylandrostane-3β,5α,17β-triol and 18.2 g. of chromic oxide in 360 ml. of pyridine was stirred for twenty-four hours at room temperature. The reaction mixture was worked up by extraction with ethyl acetate and washing with acid to remove pyridine. There was thus obtained 7.24 g. of 6β - methyl-17α-propynylandrostane-5α,17β-diol-3-one, M.P. 249.2–256.2° C. (corr.) when recrystallized from ethyl acetate; $[\alpha]_D = -43.7°$ (1% in chloroform).

Analysis.—Calcd. for $C_{23}H_{34}O_3$ (percent): C, 77.05; H, 9.56. Found (percent): C, 77.20; H, 9.34.

(d) 6α - methyl - 17α - propynyl-4-androsten-17β-ol-3-one.—A solution of 10.72 g. of 6β-methyl-17α-propynylandrostane-5α,17β-diol-3-one and 5.00 g. of potassium hydroxide in 400 ml. of methanol and 40 ml. of water was refluxed for two hours under nitrogen atmosphere. The reaction mixture was cooled, 5 ml. of acetic acid was added and the solution concentrated in vacuo. The residue was extracted with ethyl acetate, and the ethyl acetate solution was washed with ammonium carbonate solution, water and sodium chloride solution, dried and concentrated to give 5.51 g. of product, M.P. 85–101° C. (uncorr.). The latter product was chromatographed on silica gel and recrystallized from aqueous ethanol to give 6α-methyl-17α-propynyl-4-androsten-17β-ol - 3 - one in the form of colorless plates, M.P. 90–110° C. (uncorr.).

(e) 2 - hydroxymethylene - 6α - methyl-17α-propynyl-4-androsten - 17β - ol - 3 - one was prepared from 4.27 g. of 6α - methyl - 17α - propynyl-4-androsten-17β-ol-3-one, 10 ml. of ethyl formate and 2.40 g. of sodium hydride in 250 ml. of benzene according to the manipulative procedure described above in Example 2. There was thus obtained 4.70 g. of 2 - hydroxymethylene-6α-methyl-17α-propynyl - 4 - androsten-17β-ol-3-one, M.P. 89–93° C. (uncorr.).

(f) 17β - hydroxy - 6α - methyl - 17α - propynyl-4-androsteno[3.2-c]pyrazole was prepared from 2.30 g. of 2 - hydroxymethylene - 6α - methyl - 17α - propynyl-4-androsten - 17β - ol - 3 - one and 0.38 g. of hydrazine hydrate in 50 ml. of ethanol according to the manipulative procedure described above in Example 5. The product was chromatographed on silica gel and recrystallized from methanol to give 17β-hydroxy-6α-methyl-17α-propynyl - 4 - androsteno[3.2-c]pyrazole, M.P. indefinite starting at 160.4° C. (corr.), $[\alpha]_D^{25} = +3.6 \pm 0.9°$ (1% in chloroform).

Analysis.—Calcd. for $C_{24}H_{32}N_2O$ (percent): C, 79.07; H, 8.85; N, 7.69. Found (percent): C, 79.04; H, 8.62; N, 7.48.

EXAMPLE 90

(a) 2 - hydroxymethylene-17α-ethyl-4,6-androstadien-17β - ol - 3 - one was prepared from 4.08 g. of 17α-ethyl - 4,6 - androstadien - 17β - ol-3-one, 5 ml. of ethyl formate and 1.4 g. of sodium hydride in 100 ml. of benzene according to the manipulative procedure described above in Example 2. The crude product was used directly in the following reaction.

(b) 17β - hydroxy - 17α - ethyl - 4,6 - androstadieno-[3.2-c]pyrazole [VIII; R and R' are H, R" is $C_2H_5$, X is $H_2$, Z is OH, Y and Y' are $CH_3$] was prepared from 4.0 g. of 2-hydroxymethylene-17α-ethyl-4,6-androstadien-17β-ol-3-one and 1.5 ml. of hydrazine hydrate in 100 ml. of ethanol according to the manipulative procedure described above in Example 5. The product was recrystallized from ethanol to give 3.16 g. of 17β-hydroxy-17α-ethyl-4,6 - androstadieno[3.2-c]pyrazole in the form of light yellow crystals, M.P. above 300° C. (corr.), $$[\alpha]_D^{25} = -55.4 \pm 0.1°$$

(1% in pyridine); ultraviolet maxima at 220, 225, 232, 288, 297 and 308 mμ (E=7,500, 8,500, 7,700, 8,400, 21,800 and 16,400, respectively).

Analysis.—Calcd. for $C_{22}H_{30}N_2O$ (percent): C, 78.06; H, 8.93; N, 8.28. Found (percent): C, 78.07; H, 8.99; N, 7.99.

EXAMPLE 91

17β - hydroxy - 17α - methylandrostano[3.2-c]-N-(4-chlorophenoxyacetyl)pyrazole [VI; R is H, R' is 4-$ClC_6H_4OCH_2CO$, R" is $CH_3$, X is $H_2$, Z is OH, Y and Y' are $CH_3$].—A solution of 4.68 g. of 17β-hydroxy-17α-methylandrostano[3.2-c]pyrazole and 6.25 g. of 4-chlorophenoxyacetic anhydride in 70 ml. of pyridine was allowed to stand at room temperature for two days. Water (2 ml.) was then added, and the mixture was stirred for three hours and diluted with 500 ml. of water. The precipitate which had formed was collected by filtration, dissolved in 300 ml. of ethyl acetate and washed twice with 250 ml. portions of 10% sodium bicarbonate solution and with water. The ethyl acetate solution was dried over anhydrous sodium sulfate and concentrated in vacuo. The residue was crystallized from methanol to give 4.33 g. of 17β-hydroxy - 17α - methylandrostano[3.2-c]-N-(4-chlorophenoxyacetyl)pyrazole, M.P. 122–135° C. (uncorr.). After further recrystallization from an ethyl acetate-methanol mixture and from acetone, the analytical sample was obtained having the M.P. 164.8–167.6° C. (corr.), $[\alpha]_D^{25} = +35 \pm 0.2°$ (1% in chloroform); ultraviolet maxima at 228, 260 and 287 mμ (E=14,000, 18,300 and 1,700, respectively).

Analysis.—Calcd. for $C_{29}H_{37}ClN_2O_3$ (percent): Cl, 7.13; O, 9.66. Found (percent): Cl, 7.05; O, 9.25.

EXAMPLE 92

17β - hydroxy - 17α - methyl-4-androsteno[3.2-c]-N-acetylpyrazole [VII; R is H, R' is $COCH_3$, R" is $CH_3$, X is $H_2$, Z is OH, Y and Y' are $CH_3$].—A solution of 4.00 g. of 17β-hydroxy-17α-methyl-4-androsteno[3.2-c] pyrazole and 2 ml. of acetic anhydride in 60 ml. of pyridine was kept at room temperature for forty-eight hours. The product was isolated and recrystallized from ethanol to give 3.79 g. of 17β-hydroxy-17α-methyl-4-androsteno [3.2-c]-N-acetylpyrazole containing ethanol of crystallization, M.P. 92.0–100.2° C. (corr.), $[\alpha]_D^{25} = +67.1 \pm 0.2°$ (1% in chloroform); ultraviolet maxima at 237, 256 and 289 mμ (E=7,400, 6,300 and 22,100, respectively). The analytical sample was dried at 125° C. in vacuo over phosphorus pentoxide.

Analysis.—Calcd. for $C_{23}H_{32}N_2O_2$ (percent): C, 74.96; H, 8.75. Found (percent): C, 74.92; H, 8.67.

EXAMPLE 93

17β-hydroxy - 17α - methylandrostano[3.2-c]-N-propionylpyrazole [VI; R is H, R' is $COCH_2CH_3$, R" is $CH_3$, X is $H_2$, Z is OH, Y and Y' are $CH_3$] was prepared from 3.20 g. of 17β-hydroxy-17α-methylandrostano[3.2-c] pyrazole and 3 ml. of propionic anhydride in 40 ml. of pyridine according to the manipulative procedure described above in Example 92. The product was recrystallized from ethanol to give 17β-hydroxy-17α-methylandrostano[3.2-c]-N-propionylpyrazole containing ethanol of crystallization, M.P. indefinite starting at 121.8° C. (corr.), $[\alpha]_D^{25} = +43.5°$ (1% in chloroform); ultraviolet maximum at 258 mμ (E=18,800). The ethanol of crystallization could be removed by heating the substance at 97° C. for twenty hours over phosphorus pentoxide.

Analysis.—Calcd. for $C_{24}H_{36}N_2O_2$ (percent): C, 74.96; H, 9.44; N, 7.29. Found (percent): C, 74.61; H, 9.39; N, 7.20.

EXAMPLE 94

(a) 17α-propyl-4-androsten-17β-ol-3-one was prepared by Oppenauer oxidation of 17α-propyl-5-androsten-3β,17β-diol according to the procedure of Butenandt et al., Ber. 71, 2688 (1938). The product was recrystallized from a benzene-hexane mixture to give 17α-propyl-4-androsten-17β-ol-3-one, M.P. 114.6–116.0° C (1% in chloroform); ultraviolet maximum at 241 mμ (E= 16,800).

*Analysis.*—Calcd. for $C_{22}H_{34}O_2$ (percent): C, 79.95; H, 10.37; O, 9.68. Found (percent): C, 80.10; H, 10.64; O, 9.75.

(b) 2-hydroxymethylene - 17α - propyl-4-androsten-17β-ol-3-one was prepared from 5.0 g. of 17α-propyl-4-androsten-17β-ol-3-one, 9 ml. of ethyl formate and 0.4 g. of sodium hydride in 150 ml. of benzene according to the manipulative procedure described above in Example 2. The 4.4 g. of product thus obtained was used directly in the following reaction without purification.

(c) 17β - hydroxy - 17α - propyl-4-androsteno[3.2-c]pyrazole [VII; R and R' are H, R" is $CH_2CH_2CH_3$, X is $H_2$, Z is OH, Y and Y' are $CH_3$] was prepared from 4.4 g. of 2-hydroxymethylene-17α-propyl-4-androsten-17β-ol-3-one and 2.2 ml. of hydrazine hydrate in 150 ml. of ethanol according to the manipulative procedure described above in Example 5. The product was chromatographed on silica gel and recrystallized from aqueous ethanol to give 1.6 g. of 17β-hydroxy-17α-propyl-4-androsteno-[3.2-c]pyrazole, M.P. 223.0–233.4° C. (corr.), $[\alpha]_D^{25}=$ +89.5° (1% in chloroform); ultraviolet maximum at 260 mμ (E=9,816).

*Analysis.*—Calcd. for $C_{23}H_{34}N_2O$ (percent): C, 77.92; H, 9.67; N, 7.90. Found (percent): C, 78.02; H, 9.78; N, 7.58.

EXAMPLE 95

(a) 2 - hydroxymethylene - 17α - propargyl-4-androsten-17β-ol-3-one was prepared from 4.2 g. of 17α-propargyl-4-androsten-17β-ol-3-one (prepared by reacting dehydroepiandrosterone acetate with propargylmagnesium bromide, hydrolysis, and oxidation by the Oppenauer procedure), 7 ml. of ethyl formate and 0.3 g. of sodium hydride in 120 ml. of benzene according to the manipulative procedure described above in Example 2. The crude product thus obtained was used directly in the following reaction.

(b) 17β - hydroxy - 17α - propargyl-4-androsteno[3.2-c]pyrazole [VII; R and R' are H, R" is $CH_2C \equiv CH$, X is $H_2$, Z is OH, Y and Y' are $CH_3$] was prepared from 2.5 g. of 2-hydroxymethylene-17α-propargyl-4-androsten-17β-ol-3-one and 1.1 ml. of hydrazine hydrate in 90 ml. of ethanol according to the manipulative procedure described above in Example 5. The product was chromatographed on silica gel and then recrystallized first from methanol and then from aqueous ethanol to give 17β-hydroxy-17α-propargyl-4-androsteno[3.2-c]pyrazole, M.P. 130.4–140.6° C. (corr.), $[\alpha]_D^{25}=+75.4°$ (1% in chloroform); ultraviolet maximum at 261 mμ (E=9,714).

*Analysis.*—Calcd. for $C_{23}H_{30}N_2O$ (percent): C, 78.81; H, 8.63; N, 7.99. Found (percent): C, 78.73; H, 8.70; N, 8.11.

EXAMPLE 96

17β - hydroxy - 17α - methyl-4-androsteno[3.2-c]-1-methylpyrazole [VII; R is H, R' and R" are $CH_3$, X is $H_2$, Z is OH, Y and Y' are $CH_3$] was prepared from 16.0 g. of 2-hydroxymethylene-17α-methyl-4-androsten-17β-ol-3-one (Example 13), 8.0 g. of methylhydrazine sulfate and 17.8 g. of sodium acetate in 500 ml. of absolute ethanol according to the manipulative procedure described above in Example 4. The product was recrystallized from acetonitrile to give 7.25 g. of 17β-hydroxy-17α - methyl-4-androsteno[3.2-c]-1-methylpyrazole, M.P. 175.2–193.2° C. (corr.), $[\alpha]_D^{25}=+103.6°$ (1% in chloroform); ultraviolet maximum at 272 mμ (E=10,400).

*Analysis.*—Calcd. for $C_{22}H_{32}N_2O$ (percent): C, 77.60; H, 9.47; N, 8.23. Found (percent): C, 77.26; H, 9.62; N, 8.00.

EXAMPLE 97

17β-hydroxy - 17α - methyl-4-androsteno[3.2-c]-1-methylpyrazole methiodide.—A mixture of 5.25 g. of 17β-hydroxy-17α-methyl - 4 - androsteno[3.2-c]-1-methylpyrazole and 15 ml. of methyl iodide in 10 ml. of methanol was heated in a bomb tube at 100° C. for two and one-half hours. The product was isolated and recrystallized from ethanol to give 17β-hydroxy-17α-methyl - 4 - androsteno[3.2-c]-1-methylpyrazole methiodide in the form of pale yellow crystals, M.P. 257.8–261.6° C. (dec.)(corr.), $[\alpha]_D^{25}=+13.3°$ (0.5% in methanol).

*Analysis.*—Calcd. for $C_{23}H_{35}IN_2O$ (percent): C, 57.25; H, 7.31; I, 26.30. Found (percent): C, 57.41; H, 7.50; I, 26.74.

EXAMPLE 98

(a) 2-hydroxymethylene - 19 - norandrostan-17β-ol-3-one was prepared from 0.829 g. of 19-norandrostan-17β-ol-3-one, 1.5 ml. of ethyl formate, 32.5 ml. of 0.186 N sodium methoxide in methanol and 20 ml. of pyridine according to the manipulative procedure described above in Example 16, part (a). The total crude product thus obtained was used directly in the following reaction.

(b) 17β-hydroxy - 19 - norandrostano[3.2-c]pyrazole [VI; R, R' and R" are H, X is $H_2$, Z is OH, Y is H, Y' is $CH_3$] was prepared from the total product obtained in part (a) above and 1.5 ml. of hydrazine hydrate in ethanol solution according to the manipulative procedure described above in Example 5. The product was recrystallized from ethanol and dried at 78° C. for one hour in vacuo over phosphorus pentoxide and then at 144° C. for six hours in vacuo over phosphorus pentoxide to give 17β-hydroxy - 19 - norandrostano[3.2-c]pyrazole. M.P. indefinite starting at 141.6° C.(corr.).

EXAMPLE 99

(a) 2-hydroxymethyleneetiocholan - 17β - ol-3-one was prepared from etiocholan-17β-ol-3-one (from reduction of 25 g. of testosterone with palladium-on-charcoal), 60 ml. of ethyl formate, 3.0 g. of sodium and 300 ml. of pyridine according to the manipulative procedure described above in Example 16, part (a). The product was chromatographed on silica gel and recrystallized from ether and from pentane to give 2-hydroxymethyleneetiocholan-17β-ol-3-one, M.P. 151.0–156.2° C. (corr.); ultraviolet maximum at 283 mμ (E=7,800).

*Analysis.*—Calcd. for $C_{20}H_{30}O_3$ (percent): C, 75.43; H, 9.50. Found (percent): C, 75.36; H, 9.56.

(b) 17β-hydroxyetiocholano[3.2-c]pyrazole [VI; R, R' and R" are H, X is $H_2$, Z is OH, Y and Y' are $CH_3$] can be prepared by reacting 2-hydroxymethyleneetiocholan-17β-ol-3-one with hydrazine hydrate in ethanol solution according to the manipulative procedure described above in Example 5.

EXAMPLE 100

(a) 2-hydroxymethylene - 17α - propylandrostan-17β-ol-3-one was prepared from 4.95 g. of 17α-propylandrostan-17β-ol-3-one (prepared by reduction of 17α-propyl-5-androsten-3β,17β-diol with palladium hydroxide catalyst and oxidation of the 3-hydroxy group to a 3-oxo group by the Oppenauer procedure), 8 ml. of ethyl formate and 0.7 g. of sodium hydride in 300 ml. of benzene according to the manipulative procedure described above in Example 2. The 4.5 g. of crude product thus obtained was used directly in the following reaction.

(b) 17β-hydroxy - 17α - propylandrostano[3.2-c]pyrazole [VI; R and R' are H, R" is $CH_2CH_2CH_3$, X is $H_2$, Z is OH, Y and Y' are $CH_3$] was prepared from 2.50 g. of 2-hydroxymethylene - 17α - propylandrostan-17β-ol-3-one and 1 ml. of hydrazine hydrate in 80 ml. of ethanol according to the manipulative procedure described above in Example 5. The product was recrystallized from aqueous ethanol to give 17β-hydroxy-17α-propylandrostano [3.2-c]pyrazole, M.P. 217.6–220.8° C. (corr.), $[\alpha]_D^{25}=$ +35.2° (1% in chloroform); ultraviolet maximum at 224 mμ (E=4,800).

*Analysis.*—Calcd. for $C_{23}R_{36}N_2O$ (percent): C, 77.48; H, 10.18; N, 7.86. Found (percent): C, 77.17; H, 9.87; N, 7.65.

EXAMPLE 101

(a) 2-hydroxymethylene - 4 - pregnene-11β,17α,21-triol - 3,20 - dione 17,20;20,21-bismethylenedioxy derivative was prepared from 17.25 g. of 4-pregnene-11β,17α,21-triol-3,20-dione 17,20;20,21-bismethylenedioxy derivative, 30 ml. of ethyl formate and 3.0 g. of sodium hydride according to the manipulative procedure described above in Example 2. There was thus obtained 17.0 g. of 2-hydroxymethylene-4-pregnene-11β,17α,21-triol-3,20 - dione 17,20; 20,21-bismethylenedioxy derivative as a yellow solid, used directly in the following reaction.

(b) 11β,17α,21-trihydroxy - 20 - oxo-4-pregneno[3.2-c] pyrazole 17,20;20,21-bismethylenedioxy derivative was prepared from 8.0 g. of 2-hydroxymethylene-4-pregnene-11β,17α,21-triol-3,20-dione 17,20;20,21-bismethylenedioxy derivative and 4 ml. of hydrazine hydrate in 300 ml. of ethanol according to the manipulative procedure described above in Example 5. There was thus obtained 6.6 g. of 11β,17α,21-trihydroxy - 20 - oxo-4-pregnano[3.2-c]pyrazole 17,20;20,21-bismethylenedioxy derivative, M.P. 210–240° C. (uncorr.). Chromatography on silica gel and recrystallization from an ethanol-ethyl acetate mixture gave a sample having the M.P. 301–304° C. (uncorr.).

EXAMPLE 102

(a) 2-hydroxymethylene - 9 - fluoro-4-pregnene-11β, 17α,21-triol-3,20-dione 17,20;20,21-bismethylenedioxy derivative was prepared from 6.0 g. of 9α-fluoro-4-pregnene-11β,17α,21-triol-3,20-dione 17,20;20,21-bismethylenedioxy derivative, 15 ml. of ethyl formate and 1.3 g. of sodium hydride according to the manipulative procedure described above in Example 2. There was thus obtained 4.7 g. of 2-hydroxymethylene - 9 - fluoro-4-pregnene-11β,17α, 21-triol-3,20-dione 17,20;20,21-bismethylenedioxy derivative, M.P. 150–170° C., used directly in the following reaction.

(b) 9-fluoro-11β,17α,21-trihydroxy - 20 - oxo-4-pregneno[3.2-c]pyrazole 17,20;20,21-bismethylenedioxy derivative was prepared from 1.00 g. of 2-hydroxymethylene-9-fluoro - 4 - pregnene-11β,17α,21-triol-3,20-dione 17,20; 20,21-bismethylenedioxy derivative and 0.5 ml. of hydrazine hydrate in 40 ml. of ethanol according to the manipulative procedure described above in Example 5. There was thus obtained 0.9 g. of 9-fluoro-11β,17α,21-trihydroxy-20-oxo - 4 - pregneno[3.2-c]pyrazole 17,20;20,21-bismethylenedioxy derivative, M.P. 220–260° C. (uncorr.).

EXAMPLE 103

17α,20 - dihydroxy-4-pregneno[3.2-c]pyrazole [VII; R and R' are H, R'' is CH(OH)CH₃, X is H₂, Z is OH, Y and Y' are CH₃] can be prepared by introduction of a hydroxymethylene group into the 2-position of 4-pregnene-17α,20-diol-3-one according to the manipulative procedure described above in Example 1, part (a), followed by reacting the resulting product with hydrazine according to the manipulative procedure described above in Example 1, part (b).

EXAMPLE 104

17α-caproyloxy-20-oxo - 4 - pregneno[3.2-c]pyrazole [VII; R and R' are H, R'' is COCH₃, X is H₂, Z is OCO(CH₂)₄CH₃, Y and Y' are CH₃] can be prepared by reacting 17α,20-dihydroxy - 4 - pregneno[3.2-c]pyrazole with potassium cyanate in the presence of acid to give the corresponding N-carbamyl derivative, oxidation by means of chromium trioxide in pyridine to yield the 20-ketone, esterification of the latter with a mixture of caproic acid and caproic anhydride in the presence of p-toluenesulfonic acid, and finally hydrolysis of the N-carbamyl group in the presence of dilute acid.

EXAMPLE 105

9α-fluoro-17β-hydroxy-11-oxo-17α-methyl - 4 - androsteno[3.2-c]pyrazole can be prepared by introduction of a hydroxymethylene group into the 2-position of 9α-fluoro - 17α-methyl-4-androsten-17β-ol-3,11-dione according to the manipulative procedure described above in Example 1, part (a) followed by reacting the resulting product with hydrazine according to the manipulative procedure described above in Example 1, part (b).

EXAMPLE 106

9β,11β-epoxy-17α-methyl-17β-hydroxy - 4 - androsteno-[3.2-c]pyrazole can be prepared by introduction of a hydroxymethylene group into the 2-position of 9β,11β-epoxy-17α-methyl-4-androsten-17β-ol-3-one according to the manipulative procedure described above in Example 1, part (a) followed by reacting the resulting product wtih hydrazine according to the manipulative procedure described above in Example 1, part (b).

The latter compound can be caused to react with hydrofluoric, hydrochloric, hydrobromic or hydriodic acid to give, respectively, 9α-fluoro-, 9α-chloro-, 9α-bromo-, or 9α-iodo-17α-methyl-11β,17β-dihydroxy - 4 - androsteno-[3.2-c]pyrazole.

EXAMPLE 107

(a) 2-hydroxymethylene-4-androstene - 11β,17β - diol-3-one was prepared from 13.11 g. of 4-androstene-11β, 17β-diol, 20 ml. of ethyl formate and 7.20 g. of sodium hydride according to the manipulative procedure described above in Example 2. The product was recrystallized from ethyl acetate to give 2-hydroxymethylene-4-androstene-11β,17β-diol-3-one, M.P. 168–190° C. (uncorr.); ultraviolet maxima at 251 and 307 mμ (E=11,700 and 5,200, respectively).

(b) 11β,17β - dihydroxy-4-androsteno[3.2-c]pyrazole [VII; R, R' and R'' are H, X is (H)(OH), Z is OH, Y and Y' are CH₃] was prepared from 3.48 g. of 2-hydroxymethylene-4-androstene - 11β,17β - diol-3-one and 0.60 g. of hydrazine hydrate in 50 ml. of ethanol according to the manipulative procedure described above in Example 5. The product was recrystallized from ethanol to give 11β,17β-dihydroxy-4-androsteno[3.2-c]pyrazole containing 1 mole of ethanol of crystallization, M.P. 233.2–246.0° C. (corr.); ultraviolet maximum at 262 mμ (E=10,700).

*Analysis.*—Calcd. for $C_{20}H_{28}N_2O_2 \cdot C_2H_5OH$ (percent): C, 70.55; H, 9.15; N(basic), 3.74. Found (percent): C, 70.80; H, 9.37; N(basic), 4.00.

EXAMPLE 108

(a) 2 - hydroxymethylene-17α-methyl-19-nor-4-androsten-17β-ol-3-one was prepared from 17.26 g. of 17α-methyl-19-nor-4-androsten-17β-ol-3-one, 20 ml. of ethyl formate and 4.80 g. of sodium hydride according to the manipulative procedure described above in Example 2. There was thus obtained 17.0 g. of 2-hydroxymethylene-17α - methyl-19-nor-4-androsten-17β-ol-3-one; ultraviolet maximum at 246 mμ (E=10,800).

(b) 17α-methyl-17β-hydroxy-19-nor - 4 - androsteno-[3.2-c]pyrazole [VII; R and R' are H, R'' is CH₃, X is H₂, Z is OH, Y is H, Y' is CH₃] was prepared from 6.36 g. of 2-hydroxymethylene-17α-methyl-19-nor - 4 - androsten-17β-ol-3-one and 1.00 g. of hydrazine hydrate in 100 ml. of ethanol according to the manipulative procedure described above in Example 5. The product was chromatographed on silica gel, and recrystallized several times from methanol and finally from ethanol. The purified product was dried for twenty-four hours in vacuo at 100° C. over phosphorus pentoxide to give 17α-methyl-17β-hydroxy-19-nor-4-androsteno[3.2-c]pyrazole with one-half mole of ethanol of crystallization, M.P. 111.0–126° C. (dec.)(corr.), $[\alpha]_D^{25}=+0.2°$ (1% in chloroform).

*Analysis.*—Calcd. for $C_{20}H_{28}N_2O \cdot 1/2 C_2H_5OH$ (percent): C, 75.18; H, 9.32; N(basic), 4.17; $C_2H_5O$, 6.72. Found (percent): C, 75.30; H, 9.41; N(basic), 4.21; $C_2H_5O$, 6.98.

EXAMPLE 109

17α-methyl - 17β - hydroxy - 1,3,5 - estratrieno[3.2-c] pyrazole can be prepared by heating 17α-methyl-17β-hydroxy-19-nor - 4 - androsteno[3.2-c]pyrazole with palladium catalyst; or by bromination of the latter compound at the 10-position by means of N-bromosuccinimide, followed by dehydrobromination by heating with collidine or with lithium chloride in dimethylformamide solution.

EXAMPLE 110

(a) 2 - hydroxymethylene - 17α - propynylandrostan-17β-ol-3-one was prepared from 5.0 g. of 17α-propynylandrostan-17β-ol-3-one, 6.5 ml. of ethyl formate and sodium methoxide (from 2.0 g. of sodium and 30 ml. of methanol) according to the manipulative procedure described above in Example, part (a). There was thus obtained 5.5 g. of 2-hydroxymethylene-17α-propynylandrostan-17β-ol-3-one in the form of a resin, used directly in the following reaction.

(b) 17β - hydroxy - 17α - propynylandrostano[3.2-c]pyrazole [VI; R and R' are H, R'' is C≡CCH₃, X is H₂, Z is OH, Y and Y' are CH₃] was prepared from 2.0 g. of 2 - hydroxymethylene-17α-propynylandrostan-17β-ol-3-one and 0.4 ml. of hydrazine hydrate in 50 ml. of methanol according to the manipulative procedure described above in Example 5. The product was recrystallized from ethyl acetate to give 17β-hydroxy-17α-propynylandrostano[3.2-c]pyrazole, M.P. indefinite starting at 143.2° C. (corr.), $[\alpha]_D^{25} = -29.6°$ (1% in pyridine), −29.3° (1% in dimethylformamide); ultraviolet maximum at 224 mμ (E=5,400).

*Analysis.*—Calcd. for $C_{23}H_{32}N_2O$ (percent): C, 78.36; H, 9.15; O, 4.54. Found (percent): C, 78.04; H, 9.10; O, 4.64.

EXAMPLE 111

5,6-epoxy-17β-hydroxy - 17α - methylandrostano[3.2-c]pyrazole.—A solution of 2.00 g. of 17β-hydroxy-17α-methyl-4-androsteno[3.2-c]pyrazole and 21.21 ml. of an ethereal solution of 0.302 M monoperphthalic acid in 979 ml. of ethyl acetate was allowed to react at room temperature for ninety-three hours. The product was isolated and recrystallized from an ethyl acetate-methanol mixture to give 1.37 g. of 5,6-epoxy-17β-hydroxy-17α-methylandrostano[3.2-c]pyrazole, M.P. 253–258° C. (uncorr.). A further recrystallization from methanol gave a sample having the M.P. 259.5–264° C. (uncorr.), partially solidfying and remelting above 300° C.; ultraviolet maximum at 238 mμ (E=18,300).

5,6-epoxy-17β-hydroxy - 17α - methylandrostano[3.2-c]pyrazole can be caused to react with hydrofluoric acid, hydrochloric acid, hydrobromic acid or hydriodic acid in acetone solution to give, respectively, 4-fluoro-, 4-chloro-, 4-bromo- or 4-iodo-17β-hydroxy-17α-methyl-4-androsteno[3.2-c]pyrazole.

According to the methods described hereinabove there can also be prepared the following: 6α-methyl-17α-acetoxy-20-oxo-4-pregneno[3.2-c]pyrazole, 9α-fluoro-21-acetoxy-11β,16α,17α-trihydroxy - 20 - oxo-1,4-pregnadieno-[3.2-c]pyrazole 16,17-acetonide, 6α,9α-difluoro-11β,17α,21-trihydroxy-20-oxo-4-pregneno[3.2-c]pyrazole, 6α-chloro-9α-fluoro-11β,16α,17α,21-tetrahydroxy - 20 - oxo-1,4-pregnadieno[3.2 - c]pyrazole, 17α-ethyl-17β-hydroxy-19-nor-4-androsteno[3.2 - c]pyrazole, 16α-methyl-9α-fluoro-11β,21-dihydroxy - 20 - oxo-1,4-pregnadieno[3.2-c]pyrazole, 17α-ethynyl-17β-hydroxy-19-nor-4-androsteno[3.2-c] pyrazole, 20-oxo-19-nor-4-pregneno[3.2-c]pyrazole, and 20-oxo-4,11-pregnadieno[3.2-c]pyrazole.

I claim:

1. A steroido[3.2-c]pyrazole, said steroid moiety having from seventeen to about twenty-three carbon atoms exclusive of ester radicals and being selected from the group consisting of the estrane, 18-norestrane, androstane, etiocholane, pregnane and allopregnane series.

2. A compound selected from the group consisting of (A) compounds having the formula selected from

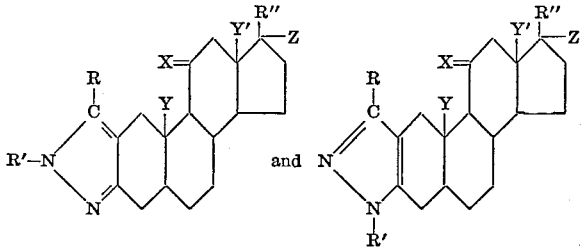

wherein R represents a member of the group consisting of hydrogen and lower-alkyl radicals; R' represents a member of the group consisting of hydrogen, lower-alkyl radicals, monocarbocyclic aryl, lower-alkanoyl radicals, monocarbocyclic aryloxy-lower-alkanoyl radicals, the carbamyl radical, and the guanyl radical; R'' represents a member of the group consisting of hydrogen, lower-alkyl radicals, lower-alkenyl radicals, lower-alkynyl radicals, the acetyl radical, ketalized acetyl radicals, the hydroxyacetyl radical, ketalized hydroxyacetyl radicals, the 1,2-dihydroxyethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R'' represents a member of the group consisting of hydrogen, lower-alkyl, lower-alkenyl and lower-alkynyl radicals; (B) carboxylic acid esters thereof derived from carboxylic acids having from one to about ten carbon atoms and having a molecular weight less than about 200; (C) acid-addition salts of basic members thereof; and (D) quaternary ammonium salts of basic members thereof.

3. A compound selected from the group consisting of (A) compounds having the formula

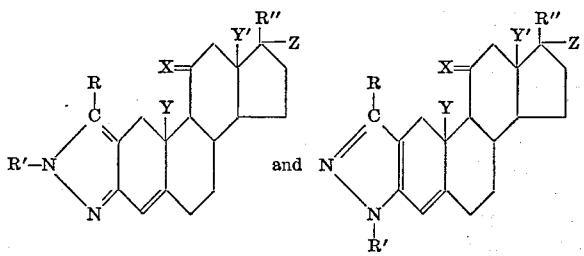

wherein R represents a member of the group consisting of hydrogen and lower-alkyl radicals; R' represents a member of the group consisting of hydrogen, lower-alkyl radicals, monocarbocyclic aryl, lower-alkanoyl radicals, monocarbocyclic aryloxy-lower-alkanoyl radicals, the carbamyl radical, and the guanyl radical; R'' represents a member of the group consisting of hydrogen, lower-alkyl radicals, lower-alkenyl radicals, lower-alkynyl radicals, the acetyl radical, ketalized acetyl radicals, the hydroxyacetyl radical, ketalized hydroxyacetyl radicals, the 1,2-dihydroxyethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R'' represents a member of the group consisting of hydrogen, lower-alkyl, lower-alkenyl and lower-alkynyl radicals; (B) carboxylic acid esters thereof derived from carboxylic acids having from one to about ten carbon atoms and having a molecular weight less than about 200; (C) acid-addition salts of basic members thereof; and (D) quaternary ammonium salts of basic members thereof.

4. A compound selected from the group consisting of (A) compounds having the formula

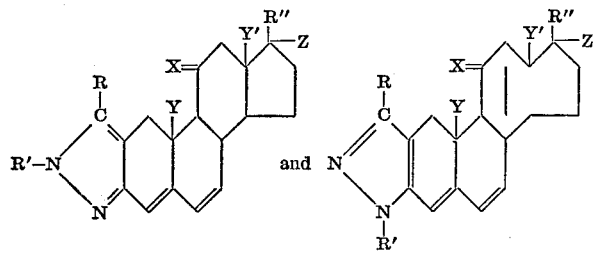

wherein R represents a member of the group consisting of hydrogen and lower-alkyl radicals; R' represents a member of the group consisting of hydrogen, lower-alkyl radicals, monocarbocylic aryl, lower-alkanoyl radicals, monocarbocyclic aryloxy-lower-alkanoyl radicals, the carbamyl radical, and the guanyl radical; R" represents a member of the group consisting of hydrogen, lower-alkyl radicals, lower-alkenyl radicals, lower-alkynyl radicals, the acetyl radical, ketalized acetyl radicals, the hydroxyacetyl radical, ketalized hydroxyacetyl radicals, the 1,2-dihydroxyethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R" represents a member of the group consisting of hydrogen, lower-alkyl, lower-alkenyl and lower-alkynyl radicals; (B) carboxylic acid esters thereof derived from carboxylic acids having from one to about ten carbon atoms and having a molecular weight less than about 200; (C) acid-addition salts of basic members thereof; and (D) quaternary ammonium salts of basic members thereof.

5. 17β-hydroxy-17α-methylandrostano[3.2-c]pyrazole.
6. 17β - hydroxy - 17α - methyl - 4 - androsteno[3.2-c]pyrazole.
7. 17α - ethynyl - 17β - hydroxy - 4 - androsteno[3.2-c]pyrazole.
8. 17-oxo-4-androsteno[3.2-c]pyrazole.

9. The process for preparing a pyrazole compound fused through its 3- and 4-positions to the 3- and 2-positions, respectively, of a steroid nucleus, said steroid having from seventeen to about twenty-three carbon atoms exclusive of ester radicals, which comprises reacting a 2-(1-hydroxyalkylidene)-3-oxo-steroid with a member of the group consisting of hydrazine and hydrazine mono-substituted by a radical inert under the conditions of the reaction, the steroid moiety having from seventeen to about twenty-three carbon atoms exclusive of ester radicals and being selected from the group consisting of the estrane, 18-norestrane, androstane, etiocholane, pregnane and allopregnane series.

10. The process for preparing a compound selected from the group consisting of (A) compounds having the formula selected from

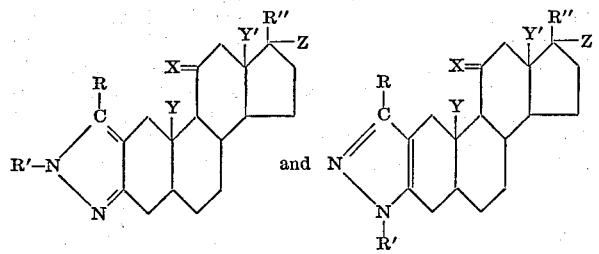

wherein R represents a member of the group consisting of hydrogen and lower-alkyl radicals; R' represents a member of the group consisting of hydrogen, lower-alkyl radicals, monocarbocyclic aryl, lower-alkanoyl radicals, the carbamyl radical, and the guanyl radical; R" represents a member of the group consisting of hydrogen, lower-alkyl radicals, lower-alkenyl radicals, lower-alkynyl radicals, the acetyl radical, ketalized acetyl radicals, the hydroxyacetyl radical, ketalized hydroxyacetyl radicals, the 1,2-dihydroxyethyl radical and the 1-hydroxyethyl radical; X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R" represents a member of the group consisting of hydrogen, lower-alkyl, lower-alkenyl and lower-alkynyl radicals; and (B) carboxylic acid esters thereof derived from carboxylic acids having from one to about ten carbon atoms and having a molecular weight less than about 200, which comprises reacting a compound having the formula

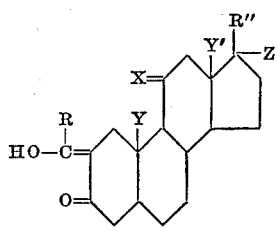

wherein R, R", X, Z, Y and Y' are identical with their selection above, with a hydrazine having the formula R'NHNH$_2$, wherein R' is identical with its selection above.

11. The process for preparing a compound selected from the group consisting of (A) compounds having the formula selected from

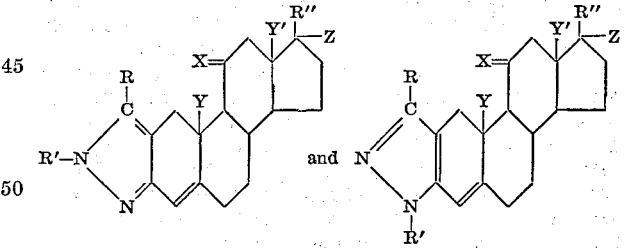

wherein R represents a member of the group consisting of hydrogen and lower-alkyl radicals; R' represents a member of the group consisting of hydrogen, lower-alkyl radicals, monocarbocyclic aryl, lower-alkanoyl radicals, the carbamyl radical, and the guanyl radical; R" represents a member of the group consisting of hydrogen, lower-alkyl radicals, lower-alkenyl radicals, lower-alkynyl radicals, the acetyl radical, ketalized acetyl radicals, the hydroxyacetyl radical, ketalized hydroxyacetyl radicals, the 1,2-dihydroxyethyl radical and the 1-hydroxyethyl radicals, X represents a member of the group consisting of $H_2$, (H)(OH) and O; Y and Y' represent a member of the group consisting of hydrogen and the methyl radical; and Z represents a member of the group consisting of hydrogen and the hydroxy radical, Z being restricted to hydroxy when R" represents a member of the group consisting of hydrogen, lower-alkyl, lower-alkenyl and lower-alkynyl radicals; and (B) carboxylic acid esters thereof derived from carboxylic acids having from one to about ten carbon atoms and having a molecular weight less than about 200, which comprises reacting a compound having the formula

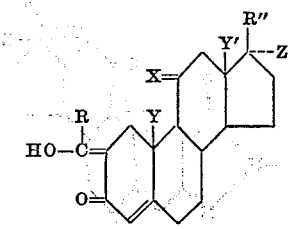

wherein R, R", X, Z, Y and Y' are identical with their selection above, with a hydrazine having the formula R'NHNH₂, wherein R' is identical with its selection above.

12. The process for preparing a compound selected from the group consisting of (A) compounds having the formula selected from

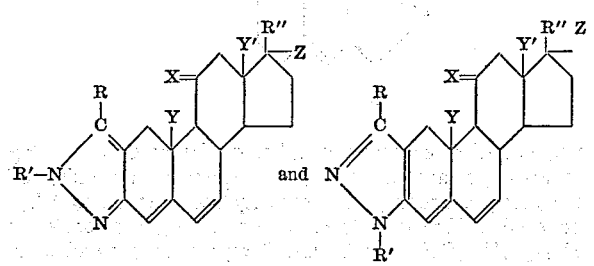

wherein R represents a member of the group consisting of hydrogen and lower-alkyl radicals; R' represents a member of the group consisting of hydrogen, lower-alkyl radicals, monocarbocyclic aryl, lower-alkanoyl radicals, the carbamyl radical, and the guanyl radical; R" represents a member of the group consisting of hydrogen, lower-alkyl radicals, lower-alkenyl radicals, lower-alkynyl radicals, the acetyl radical, ketalized acetyl radicals, the hydroxyacetyl radical, ketalized hydroxyacetyl radicals, the 1,2-dihydroxyethyl radical and the 1-hydroxyethy radical; X represents a member of the group consisting of H₂, (H)(OH) and O; Y and Y' represent a member of the group consisting of hydrogen and the methyl radical; and Z represents a member of the group consisting of hydrogen and the hydroxy radical, Z being restricted to hydroxy when R" represents a member of the group consisting of hydrogen, lower-alkyl, lower-alkenyl and lower-alkynyl radicals; and (B) carboxylic acid esters thereof derived from carboxylic acids having from one to about ten carbon atoms and having a molecular weight less than about 200, which comprises reacting a compound having the formula

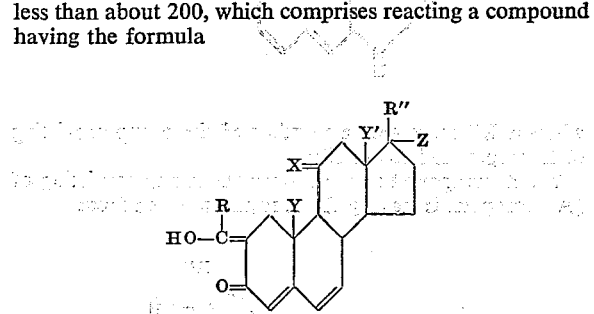

wherein R, R", X, Z, Y and Y' are identical with their selection above, with a hydrazine having the formula R'NHNH₂, wherein R' is identical with its selection above.

13. The process for preparing 17β-hydroxy-17α-methyl-androstano[3.2-c]pyrazole which comprises reacting 2-hydroxymethylene - 17α - methylandrostan - 17β - ol-3-one with hydrazine.

14. A compound of the formula

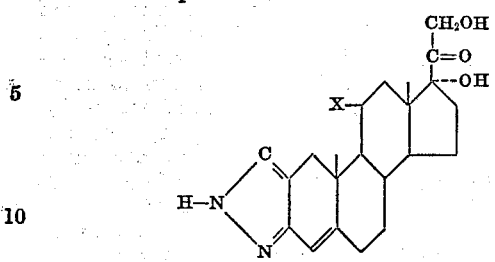

where X is selected from the group consisting of keto and β-hydroxy.

15. A compound of the formula: 17α,21-dihydroxy-11,20-dioxo-4,6-pregnadieno-[3,2-c]-pyrazole.

16. 9α-fluoro-17α,21 - dihydroxy - 11,20 - dioxo-4-pregneno-[3,2-c]-pyrazole.

17. A compound selected from the group of compounds having structural formulas A and B and the Δ⁴,⁶-analogues of said compounds

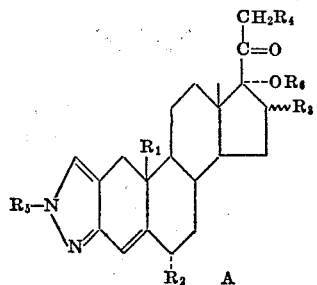

and

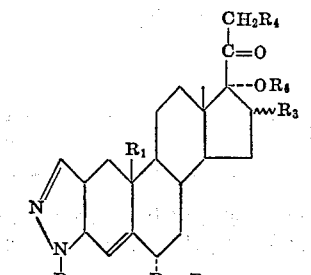

wherein R₁ is selected from the group consisting of hydrogen and methyl, R₂ is selected from the group consisting of hydrogen, α-methyl, α-fluoro and α-chloro, R₃ is selected from the group consisting of hydrogen, α-methyl and β-methyl, R₄ is hydrogen, R₅ is selected from the group consisting of hydrogen, lower alkyl and aryl, and R₆ is lower hydrocarbon carboxylic acyl.

18. A compound selected from the group consisting of (A) compounds having the formula selected from

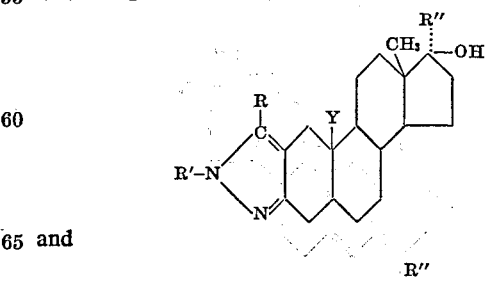

and

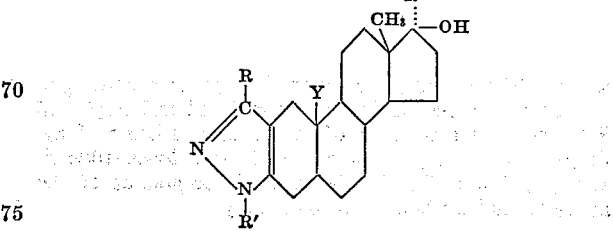

wherein R represents a member of the group consisting of hydrogen and lower-alkyl; R' represents a member of the group consisting of hydrogen, lower-alkyl, phenyl, lower-alkanoyl and monocarbocyclic aryloxy-lower-alkanoyl; R" represents a member of the group consisting of hydrogen, lower-alkyl, lower-alkenyl and lower-alkynyl; and Y represents a member of the group consisting of hydrogen and methyl; (B) 17-alkanoic acid esters thereof; and (C) lower-alkyl halide salts of compounds of the above formulas where R' is lower-alkyl.

19. A compound selected from the group consisting of (A) compounds having the formula selected from

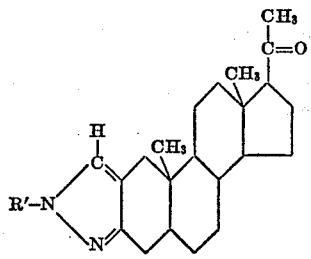

and

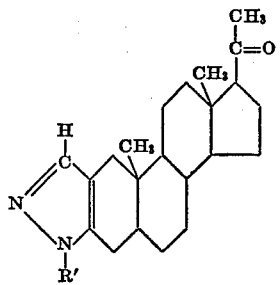

wherein R' represents a member of the group consisting of hydrogen and lower-alkyl; and (B) lower-alkyl halide salts of compounds of the above formulas where R' is lower-alkyl.

20. A compound selected from the group consisting of (A) compounds having the formula selected from

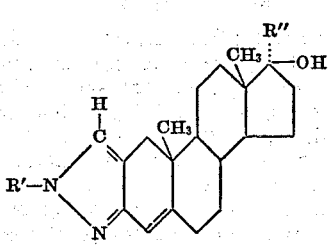

and

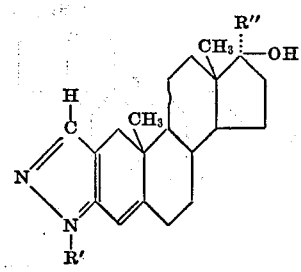

wherein R' represents a member of the group consisting of hydrogen, lower-alkyl, lower-alkanoyl and carbamyl; and R" represents a member of the group consisting of hydrogen, lower-alkyl, lower-alkenyl and lower-alkynyl; and (B) lower-alkyl halide salts of compounds of the above formulas where R' is lower-alkyl.

21. A compound selected from the group consisting of compounds having the formula selected from

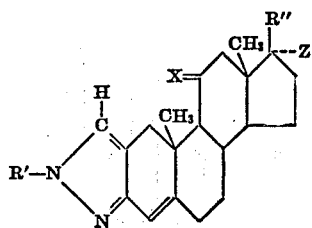

and

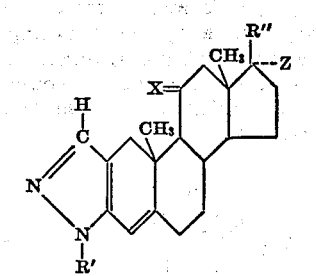

wherein R' represents a member of the group consisting of hydrogen and carbamyl; R" represents a member of the group consisting of acetyl, hydroxyacetyl and 1-hydroxyethyl; X represents a member of the group consisting of $H_2$, (H)(OH) and O; and Z represents a member of the group consisting of hydrogen and hydroxy.

22. A compound selected from the group consisting of compounds having the formula selected from

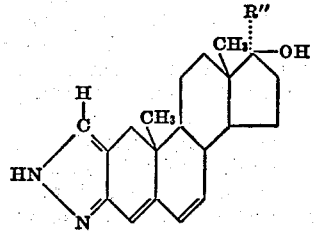

and

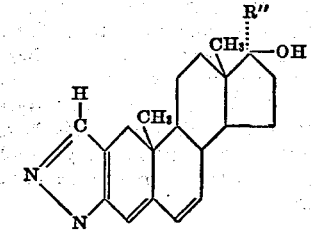

wherein R" represents a member of the group consisting of hydrogen and lower-alkyl.

23. A compound selected from the group consisting of (A) compounds having the formula selected from

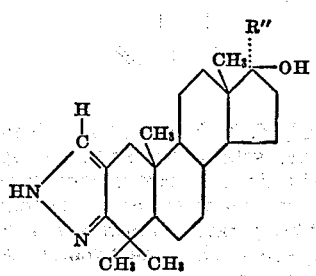

and

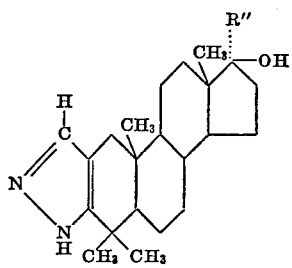

wherein R" represents a member of the group consisting of hydrogen and lower-alkyl; and (B) compounds of the above formulas where there is a double bond in the 5,6-position.

24. A compound selected from the group consisting of (A) compounds having the formula selected from

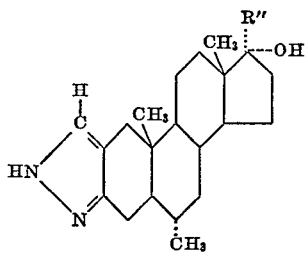

and

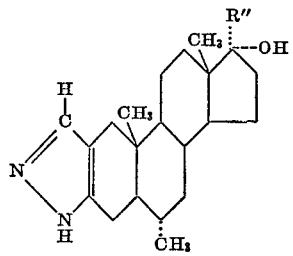

wherein R" represents a member of the group consisting of hydrogen, lower-alkyl and lower-alkynyl; and (B) compounds of the above formulas where there is a double bond in the 4,5-position.

References Cited

UNITED STATES PATENTS

| | | | |
|---|---|---|---|
| 2,813,094 | 11/1957 | Nysted | 260—239.5 |
| 2,813,859 | 11/1957 | Korman | 260—239.5 |
| 2,866,796 | 12/1958 | Jiu | 260—397.4 |
| 2,871,245 | 1/1959 | Wellstein et al. | 260—397.4 |
| 2,883,401 | 4/1959 | Babock et al. | 260—397.45 |
| 2,908,693 | 10/1959 | Ringold et al. | 260—397.4 |

OTHER REFERENCES

Weisenborn et al.: 76, JACS, 552–555 (1954).

HENRY A. FRENCH, Primary Examiner

U.S. Cl. X.R.

260—239.55 R, 239.55 C, 239.55 D, 397.3, 397.4, 397.45, 397.47, 397.5, 999